Figure 1:
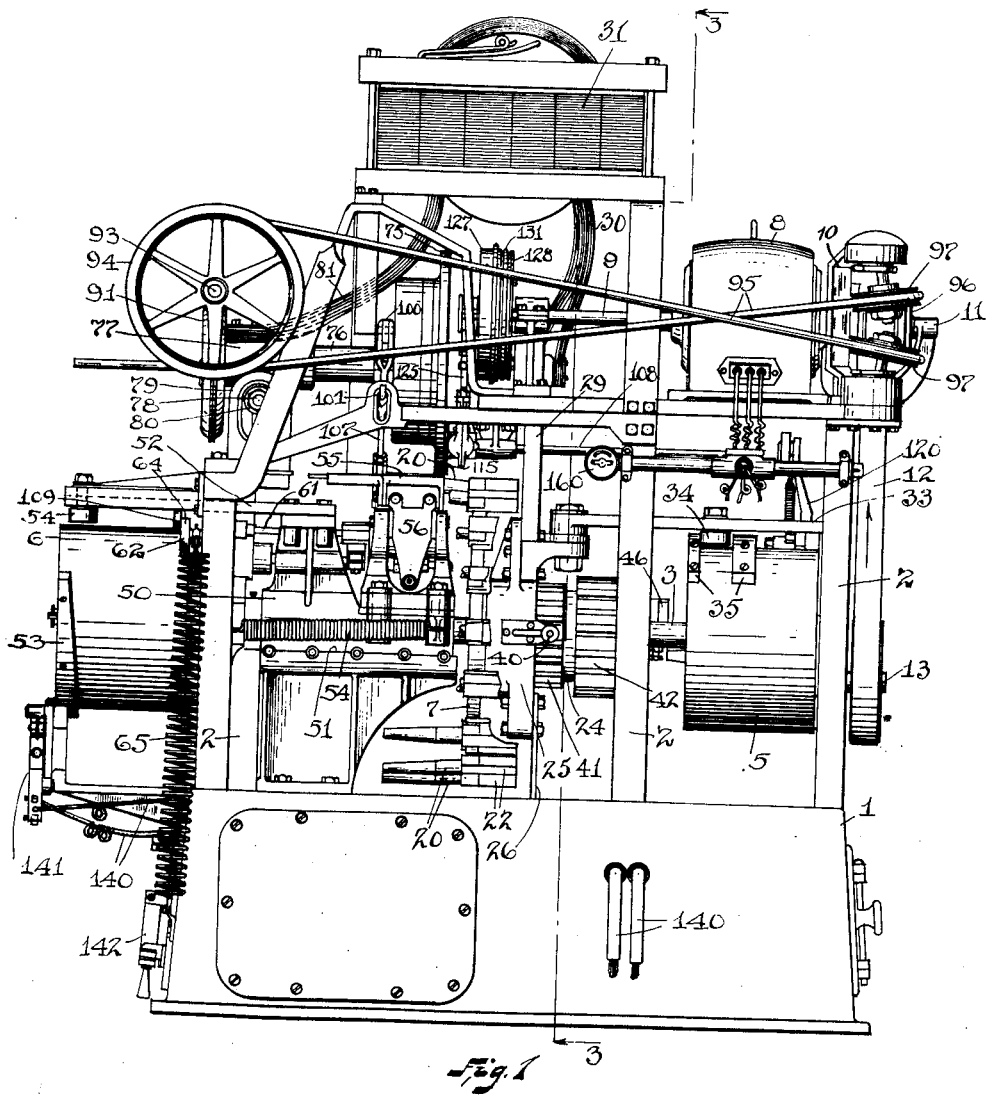

C. L. HAWES.
METHOD OF AND APPARATUS FOR ELECTRIC WELDING.
APPLICATION FILED APR. 6, 1914.

1,209,704.

Patented Dec. 26, 1916.
9 SHEETS—SHEET 1.

C. L. HAWES.
METHOD OF AND APPARATUS FOR ELECTRIC WELDING.
APPLICATION FILED APR. 6, 1914.

1,209,704.

Patented Dec. 26, 1916.
9 SHEETS—SHEET 2.

C. L. HAWES.
METHOD OF AND APPARATUS FOR ELECTRIC WELDING.
APPLICATION FILED APR. 6, 1914.

1,209,704. Patented Dec. 26, 1916.
9 SHEETS—SHEET 3.

C. L. HAWES.
METHOD OF AND APPARATUS FOR ELECTRIC WELDING.
APPLICATION FILED APR. 6, 1914.

1,209,704.

Patented Dec. 26, 1916.
9 SHEETS—SHEET 4.

Witnesses:
O. M. Kappler
H. B. Fay

Inventor
Charlie L. Hawes
By Fay & Oberlin
Attorneys

C. L. HAWES.
METHOD OF AND APPARATUS FOR ELECTRIC WELDING.
APPLICATION FILED APR. 6, 1914.
1,209,704.
Patented Dec. 26, 1916.
9 SHEETS—SHEET 5.
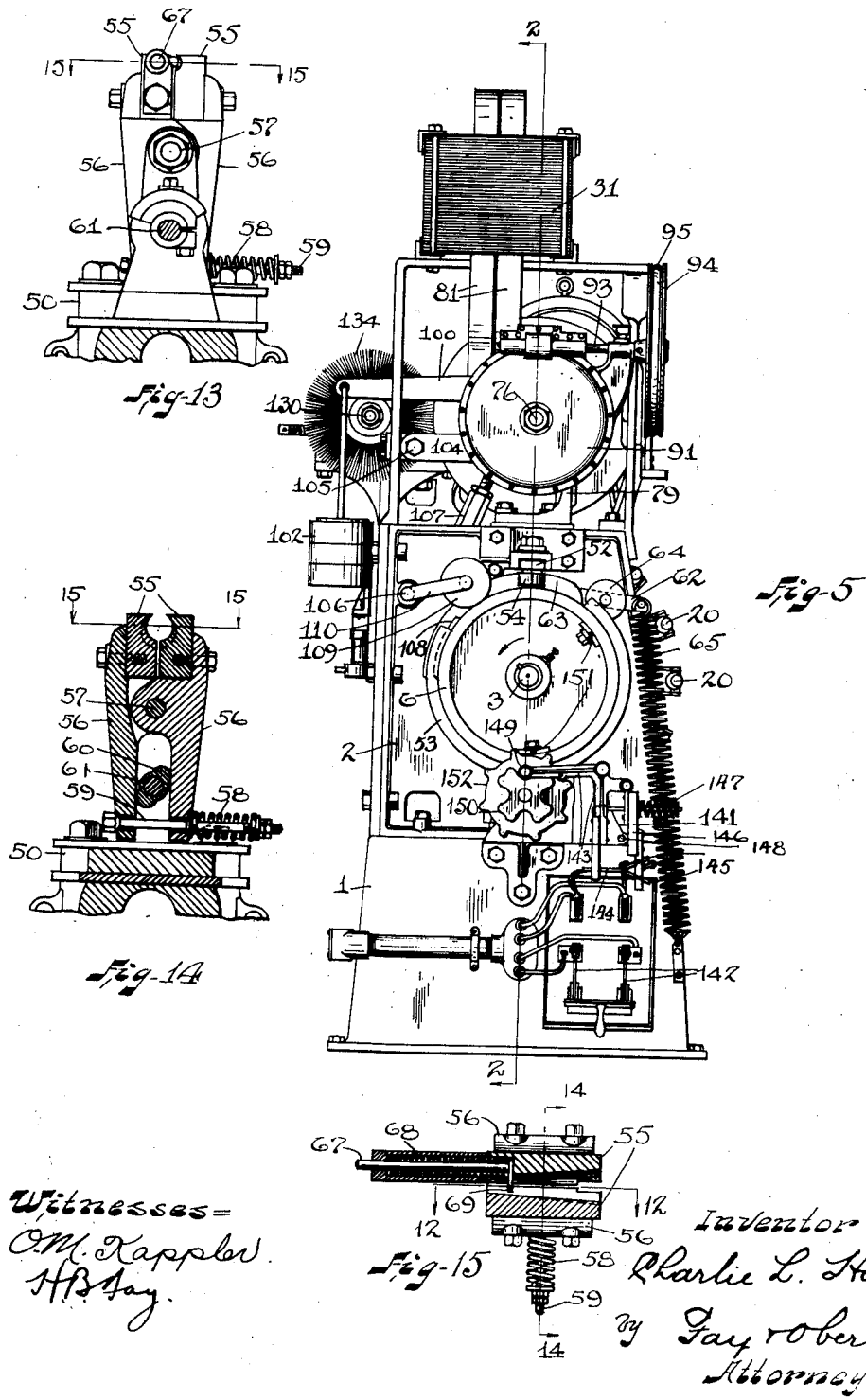
Witnesses:
O. M. Kappler.
H. B. Fay.
Inventor
Charlie L. Hawes
by Fay & Oberlin
Attorneys

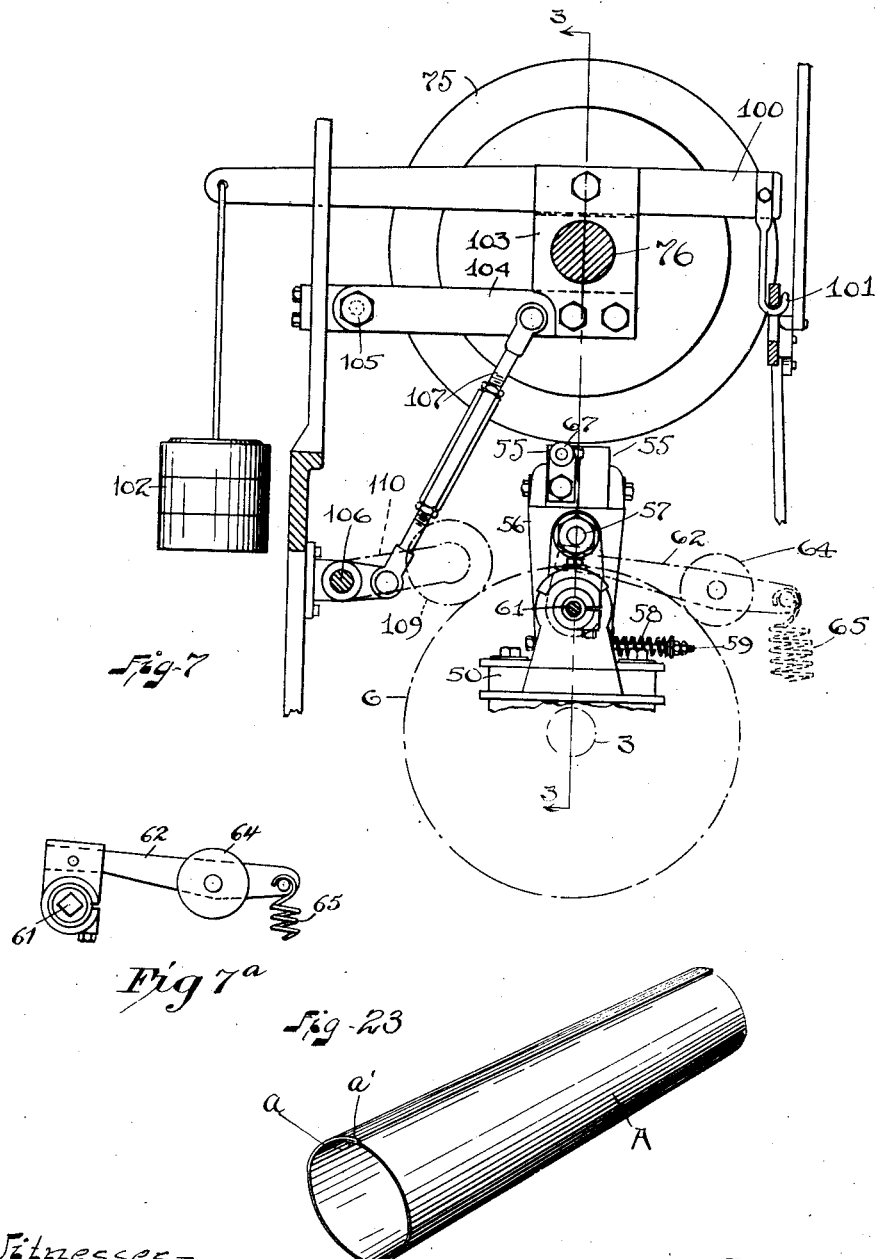

C. L. HAWES.
METHOD OF AND APPARATUS FOR ELECTRIC WELDING.
APPLICATION FILED APR. 6, 1914.
1,209,704.
Patented Dec. 26, 1916.
9 SHEETS—SHEET 7.
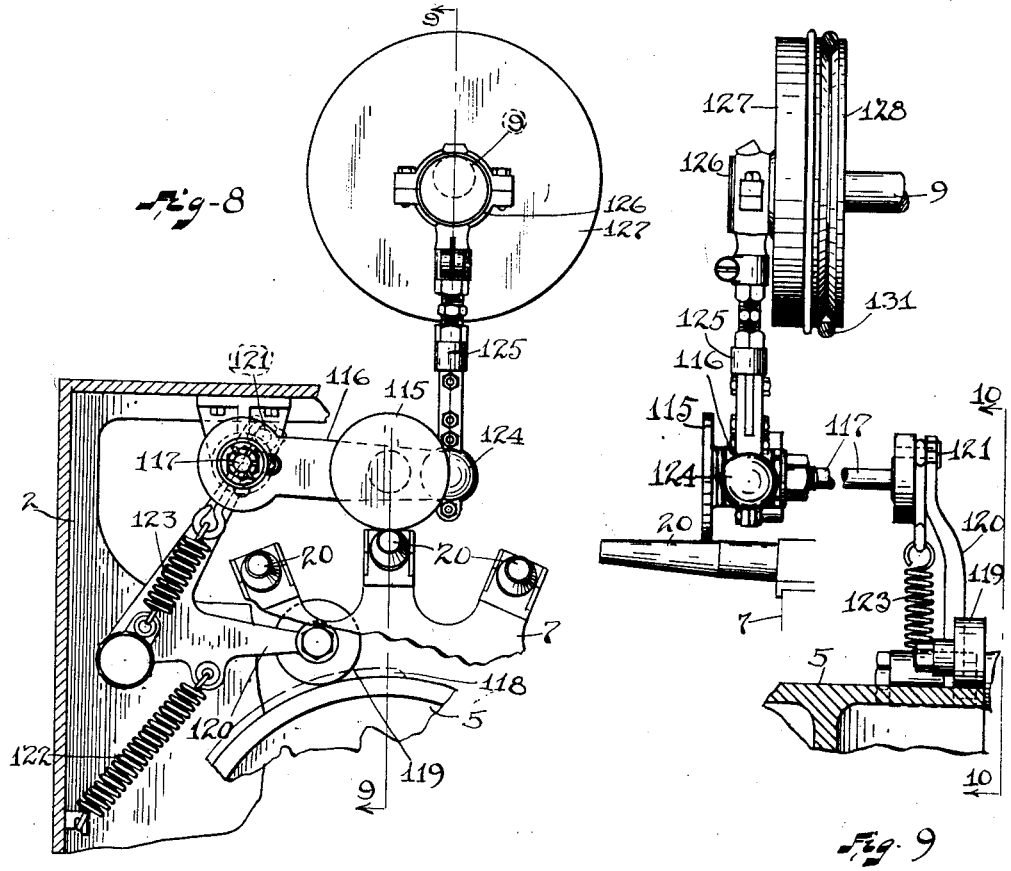

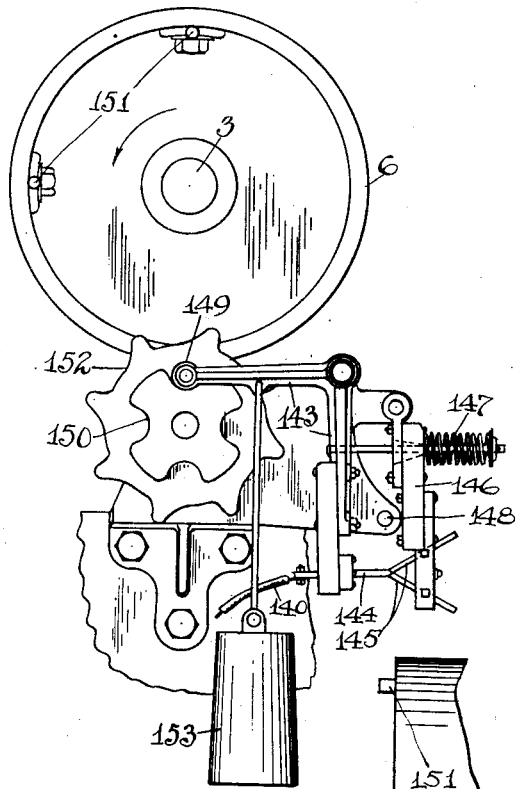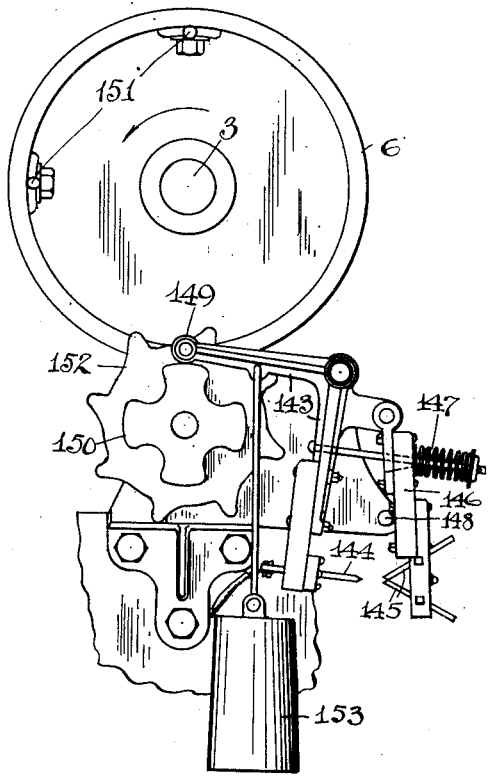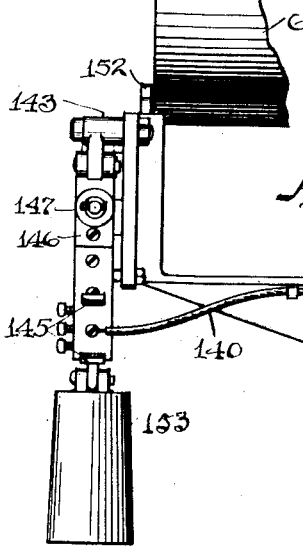

C. L. HAWES.
METHOD OF AND APPARATUS FOR ELECTRIC WELDING.
APPLICATION FILED APR. 6, 1914.

1,209,704.

Patented Dec. 26, 1916.
9 SHEETS—SHEET 9.

Witnesses=
O. M. Kappler
H. B. Fay

Inventor
Charlie L. Hawes
BY
Fay & Oberlie
Attorneys

UNITED STATES PATENT OFFICE.

CHARLIE L. HAWES, OF ASHTABULA, OHIO, ASSIGNOR TO THE AMERICAN FORK & HOE COMPANY, OF CLEVELAND, OHIO, A CORPORATION OF OHIO.

METHOD OF AND APPARATUS FOR ELECTRIC WELDING.

1,209,704.   Specification of Letters Patent.   Patented Dec. 26, 1916.

Application filed April 6, 1914.   Serial No. 829,758.

*To all whom it may concern:*

Be it known that I, CHARLIE L. HAWES, a citizen of the United States, and a resident of Ashtabula, county of Ashtabula, and State of Ohio, have invented a new and useful Improvement in Methods of and Apparatus for Electric Welding, of which the following is a specification, the principle of the invention being herein explained and the best mode in which I have contemplated applying that principle, so as to distinguish it from other inventions.

The present improvements relate more particularly to the manufacture of metallic tubes of comparatively short length and more particularly still to tapered ferrules such as are employed on the handles of rakes, hoes and like implements. In the manufacture of such tubes it is desirable to use metal of relatively light gage, so light that thus far it has been found impracticable to use the method of "butt-welding," so-called, wherein the edges of the preliminarily formed tube are brought into abutting relation and then welded by the passage of a heating electric current there across. In attempting to thus butt-weld tubes formed of thin sheets, it has been found impossible to hold the edges in proper alinement and such edges, furthermore, tend to "burn" or melt away, leaving an irregular joint, even where some semblance of a weld is obtained. Similar difficulties have heretofore been encountered in attempting to lap-weld the edges of tubes formed of sheets of this character, that is where a continuous weld or joint was desired, designers of machinery for welding together sheets of this kind restricting themselves, as is well known, to so-called "spot welding" methods, in which, instead of a continuous weld, a series of spaced welds are relied upon.

By the present improved process or method and the apparatus which I have especially designed for use in connection therewith, I am enabled to successfully lap-weld sheets of very light gage, such as are employed, for example, in the connection noted above, forming a continuous smooth seam, in which the overlapping edges of the sheet form a perfect homogeneous juncture.

A further object which I have sought to accomplish is the welding of tubes of tapering form. The apparatus thus designed, moreover, is arranged to operate substantially automatically, the cycle of steps involved being repeated over and over again on successive articles, so that a very high rate of production is secured with a corresponding economy in the cost of manufacture of the articles in question.

It will of course be understood that my improved process is not limited to the manufacture of particular articles such as that previously referred to, and that by suitable modifications, the apparatus disclosed may be adapted to the manufacture of a variety of tubular or like articles of metal preliminarily formed into the desired shape with overlapping edges, which are to be joined together.

The steps and apparatus which I employ in carrying out my invention will now be fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
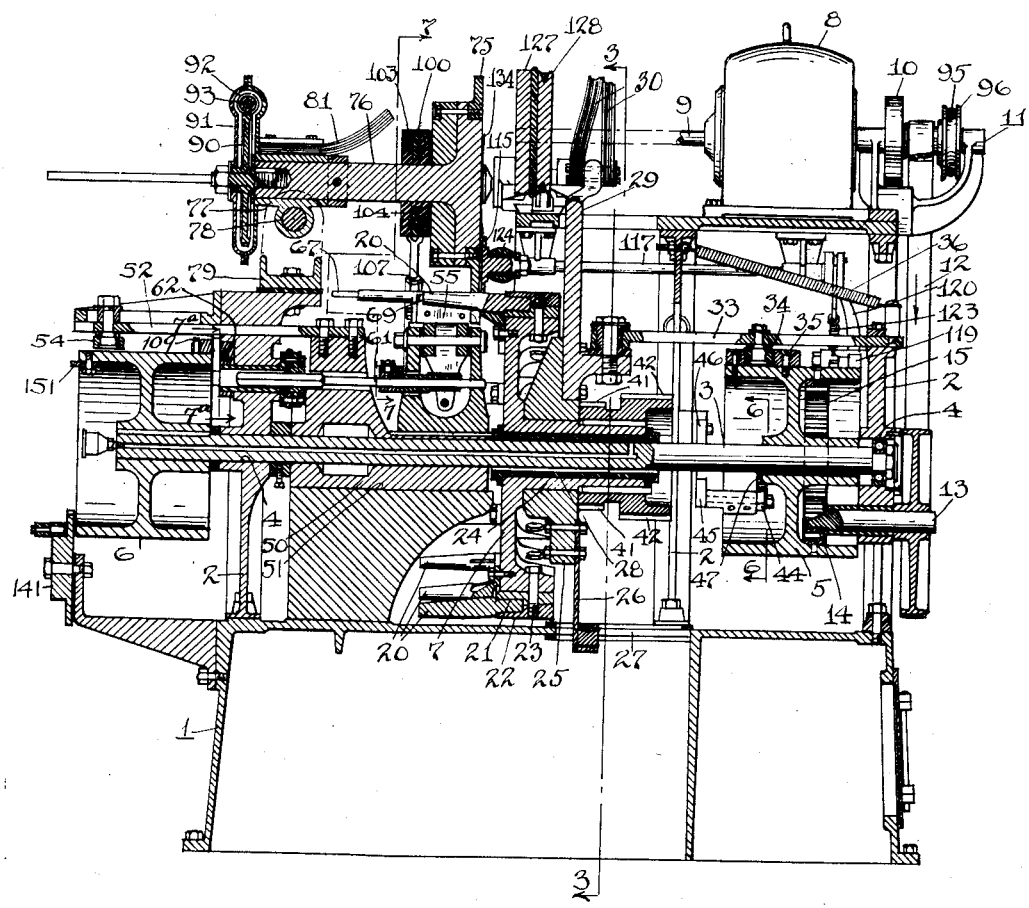
Figure 3:
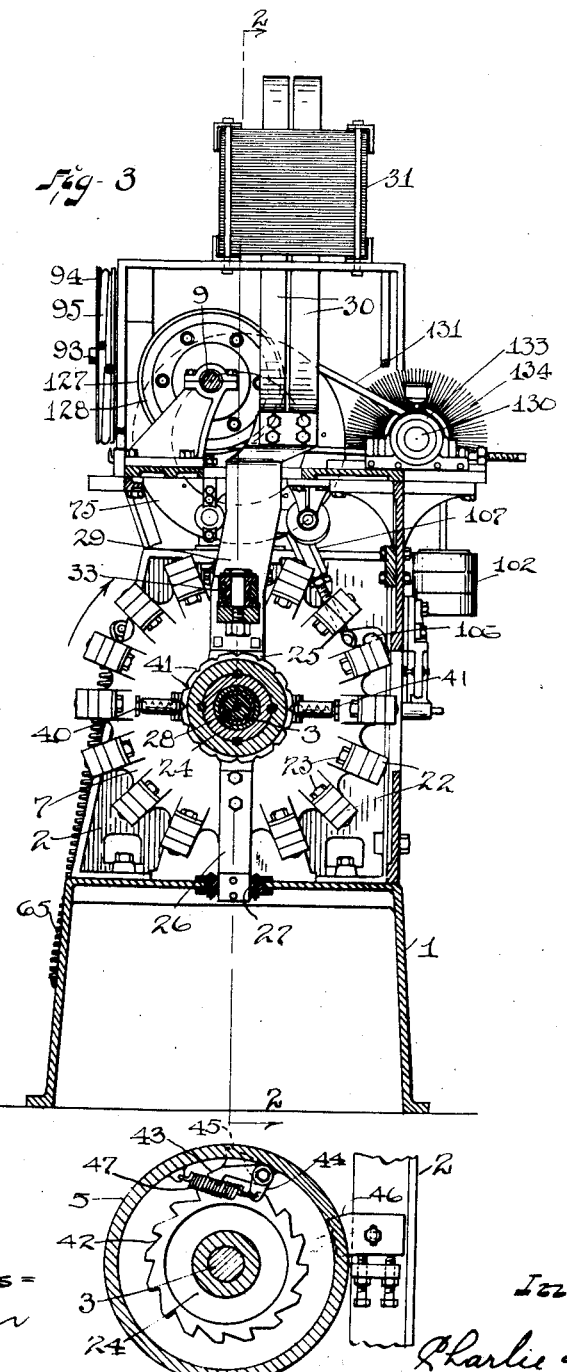
Figure 4:
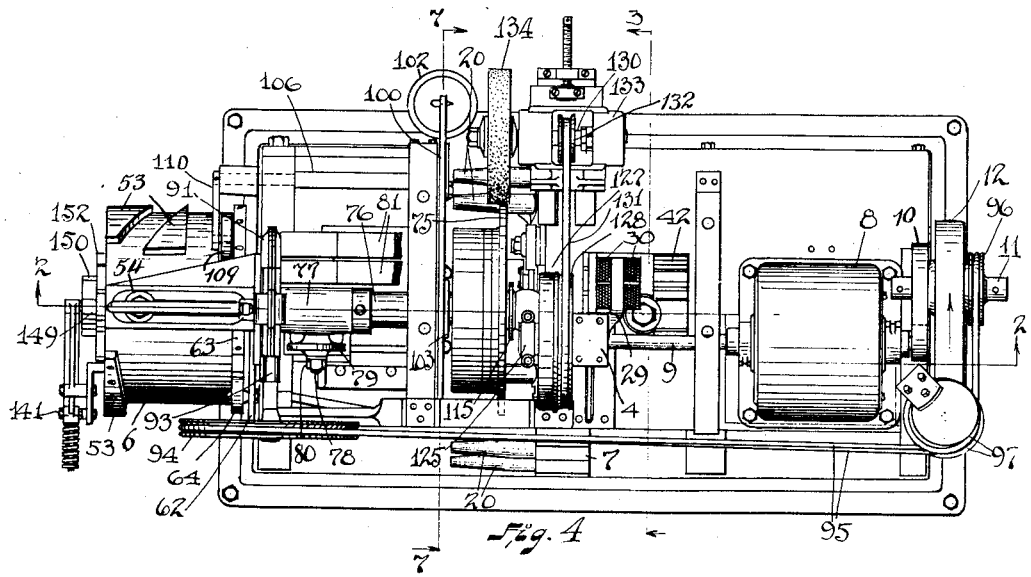
Figure 18:
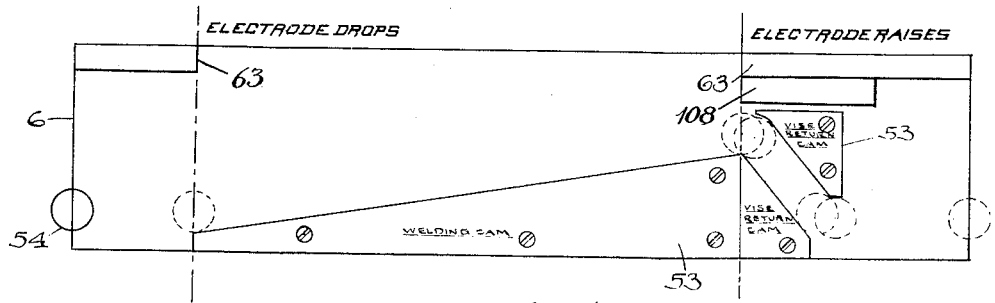
Figure 19:
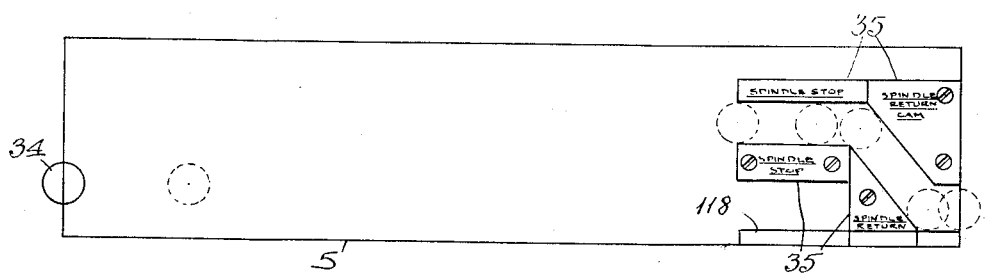
Figure 22:
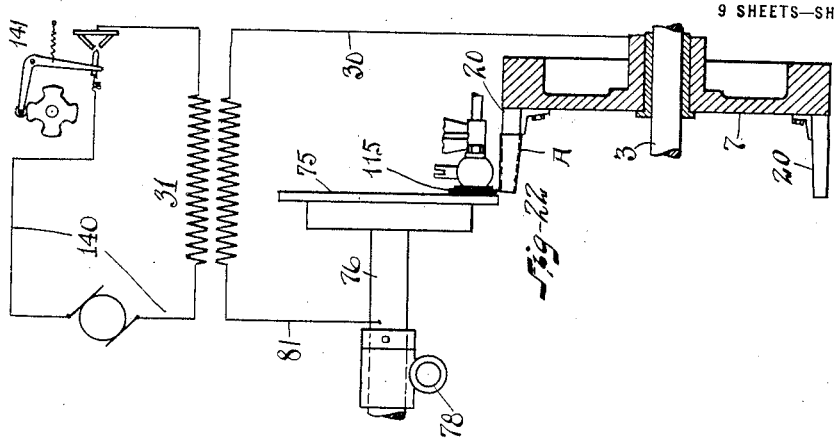
Figure 21:
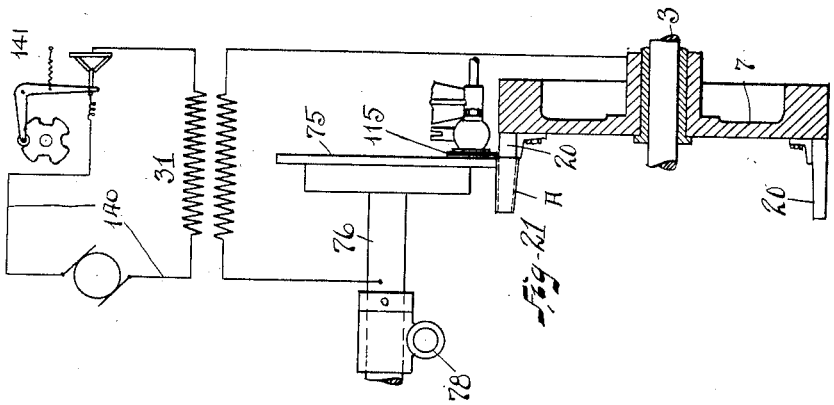
Figure 20:
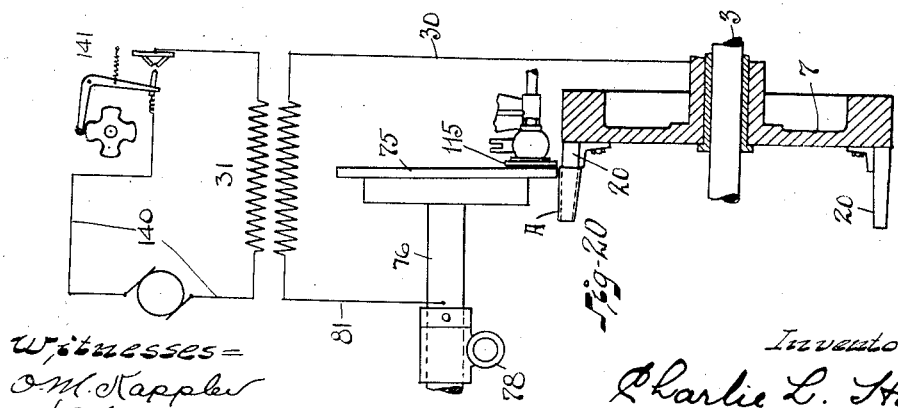

In said annexed drawings: Figure 1 is a front elevational view of an apparatus or machine adapted to carry out my improved method, where the articles to be manufactured are short, tapered tubes, such as the ferrules referred to; Fig. 2 is a vertical longitudinal section of such machine taken on a central plane; Fig. 3 is a transverse vertical section taken on the plane indicated by the line 3—3, Figs. 1 and 2; Fig. 4 is a plan view of the machine; Fig. 5 is an end view of the same as viewed from the left in Fig. 1; Fig. 6 is a transverse section of a detail as indicated by the line 6—6, Fig. 2; Fig. 7 is partly a transverse section and partly an end elevation of two details, the plane of the section being indicated by the line 7—7, Fig. 2; Fig. 7ª is a similar section taken on a plane a trifle to the left of that in Fig. 7, and showing in full lines a part appearing in dotted lines in Fig. 7. Fig. 8 is a broken end elevational view of a work hammering device forming a feature of the apparatus; Fig. 9 is a broken side elevational view of such work hammering mechanism as viewed from the right in Fig. 8; Fig. 10 is an end elevation of the same as viewed from the right in Fig. 9; Fig. 11 is a broken side elevation of the vise or work gripping mechanism, shown apart from the rest of the apparatus; Fig. 12 is an inside view of one of the vise jaws; Fig. 13 is an end elevation of such vise as viewed from the left in Fig. 11; Fig. 14 is a transverse vertical section, and Fig. 15 a longitudinal horizontal section taken on the lines 14—14 and 15—15, Fig. 11, respectively; Fig. 16 is a front elevation, and Figs. 17 and 17ª, side elevations of an automatic switch forming a feature of the machine; Fig. 18 is a developed plan view of one of the rotary cams forming a part of the apparatus specifically the one at the left viewing the machine as shown in Fig. 1; Fig. 19 is a similar developed plan view of a second rotary cam forming part of the apparatus, such cam being shown at the right in said Fig. 1; Fig. 20 is a view more or less diagrammatic in character, of the work holder with the welding electrode in its initial position just before it contacts with the work on such holder; Fig. 21 is a view similar to Fig. 20 but showing the electrode at the beginning of its operation; Fig. 22 is a view similar to Figs. 20 and 21, but showing the electrode at the end of its operation; and Fig. 23 is a perspective view of a preliminarily formed tapered tube, or ferrule, of the kind which the foregoing apparatus is particularly designed to handle.

The general frame of the machine comprises a suitably inclosed base 1 above which rise a plurality of standards 2 in which, or upon which, are supported the various operative parts of the machine. The main operative element of such machine is a longitudinally extending shaft 3 journaled in suitable bearings 4 in such standards, as shown in Fig. 2, and carrying, fixedly mounted thereon at its respective ends, cylindrical cam-drums 5 and 6 of more or less usual form, and between the latter a work carrier 7 of special construction. The arrangement of the cams on the drums can be best described after the peculiar features of construction of this work carrier and other associated parts have been set forth, inasmuch as the cams on said drum coöperate with the work carrier and such parts. For rotating the shaft 3 and the various parts carried thereby, an electric motor 8 is conveniently provided, the motor spindle 9 having geared-connection 10 with a jack-shaft 11 mounted adjacent thereto on the corresponding end standard of the frame and connected in turn by a belt 12 with a second jack-shaft 13 that is journaled below such main shaft and carries a pinion 14 meshing with an internal gear 15 carried by the adjacent drum 5.

The work carrier 7 is in the form of a disk or spider and is designed to simultaneously receive and hold a number of the articles to be welded, such articles, in the case of the specific construction illustrated, being short tapered tubes A having overlapping edges a a' as shown in Fig. 23. To thus receive such preliminarily formed tubes and successively present the same to the several mechanisms designed to operate thereon in welding such overlapping edges together, a plurality of mandrels in the form of spindles 20 are mounted on the carrier-spider so as to project laterally from one side of the same, as best shown in Figs. 1 and 2. The respective spindles fit into sockets 21, being held in such sockets by clamping plates 22 operated by set-bolts 23, and the sockets are so disposed with reference to the ends of the spindles that fit therein that the outer edge of the tapering surface of each spindle lies parallel with the axis of the carrier, or, in other words, with the axis of the main shaft of the machine upon which said carrier is both rotatably and reciprocably mounted, as will now be set forth.

As shown in Figs. 2 and 3 the carrier-spider is provided with a hub 24 extending in the opposite direction from that in which the spindles 20 project, such hub being internally journaled, so as to be rotatably held, in a slide 25 that is longitudinally reciprocable of the shaft, the slide itself being held against rotation by an arm 26 that engages a guide-way 27 in the base of the machine frame. The spider is electrically insulated from the shaft by a bushing 28 of suitable material, but has electrical contact with slide 25 which is electrically connected by means of an upwardly extending arm 29 with one flexible terminal 30 of the secondary of a transformer 31 mounted on top of the machine frame. To such slide 25, or rather to the arm 29 thereof, is also connected one end of a bar or link 33, the other end of which is slidably held in the end standard 2, said bar carrying intermediately between its ends a roller 34 that is adapted to be engaged by cam plates 35 on the drum 5 adjacent to such end. A tension spring 36 connected with the outer end of said bar normally tends to force the same, together with the work-carrier 7, to the left, so as to maintain the work-carrier in the position shown in Figs. 1 and 2, all that the cams on the drum are required to do being to restrain the movement of said bar and carrier as will be more fully explained in describing the general sequence of operations.

A pair of oppositely disposed spring-pressed plungers 40 (see Fig. 3) are arranged to simultaneously engage suitable notches 41 on the carrier-hub 24 and thereby to retain the hub, and thus the carrier, with the operatively positioned spindle properly centered in whatever angular position about its axis the carrier may happen to be left. This hub is also provided with a ratchet-wheel 42, (shown as integral therewith in Fig. 2, although this is, of course, immaterial), which is utilized to impart to such carrier an intermittent rotative movement, the pawl 43, which coöperates with such ratchet, as shown in Fig. 6, being part of a rocker 44 mounted on the inner face of the adjacent cam-drum and formed with an arm 45 disposed so as to be engaged by an adjustable trip 46 on one of the standards 2 of the machine frame. Such engagement is timed to occur when the carrier is retracted, so that the effect of the engagement will be to press the pawl against the ratchet. A spring 47 normally holds the pawl clear of the ratchet wheel.

From the foregoing construction, it will be seen that a partial rotation is imparted to said carrier once during each rotation of the drum, that is of the shaft upon which said drum is mounted, and that such rotative movement is thus imparted when the carrier has been drawn to its extreme right position as shown in Figs. 1 and 2. The extent of the successive rotative movements thus imparted to the carrier is governed by the extent of the engaging face of trip 46, this being such as to bring successive spindles on said carrier into operative position; in other words, the notches on the ratchet-wheel correspond in number and angular position with the number and position of said spindles and each partial rotation is through an arc equal to the angular distance between spindles.

Mounted on a slide 50 that is supported on a slide-way 51 so as to reciprocate longitudinally of the shaft 3, is a work gripping mechanism or vise. Such slide 50 is arranged to be thus reciprocated by means of a bar 52, that extends through the adjacent end standard 2 of the machine frame over the corresponding cam-drum 6, the latter being provided with cam-plates 53 arranged to engage a roller 54 on the bar and thus to advance and retract said bar, together with the slide and the parts borne thereby. The timing of the action of the cam-plates 53 on said drum 6 is correlated with that of the cam-plates 35 on the other drum 5, so that with the vise in its retracted position, (*i. e.* in its extreme left position, as shown in Figs. 1 and 2), such vise being normally maintained in this position by a tension spring 54, the appropriately positioned spindle on the carrier may be advanced between the jaws 55 of the vise and the latter thereupon actuated to grip the work mounted on such spindle.

The detailed construction of the vise is shown in Figs. 11, 12, 13 and 14, from which said vise will be seen to comprise two arms 56 oscillatory about the same axis 57 and adapted to have secured to their upper ends the jaws 55 previously referred to, the latter being complementary to each other and suitably formed to engage opposite sides of the preliminarily formed ferrule A, or like article which may be mounted on said spindle. A compression spring 58 coöperates with a bolt 59, extending through the lower ends of such oscillatory arms 56 of the vise, to normally draw such ends together and thereby open the upper ends or, in other words, the jaws mounted in such upper ends. Closure of the jaws is effected by means of a double cam 60 mounted on a spindle 61, that extends between the lower ends of the arms 56, so that, upon oscillation of said spindle, the said ends are forced apart against the spring and the jaws pressed together. The outer end of this spindle is of polygonal form and is slidably held in the inner end of a rocker arm 62, mounted in the machine frame, so that oscillation of the spindle may be effected by rocking said arm, irrespective of the position which the vise-slide 50 may occupy. Oscillation of the rocker arm is in turn controlled by a radial cam 63 on the same drum 6 which carries the cam-plates 53 that reciprocate the vise-slide, said arm being provided with a roller 64 that is adapted to be engaged by said cam at the proper stage in the operation of the machine. A tension spring 65 serves to hold the roller in contact with the drum and to effect the return movement of the rocker arm, which closes the jaws of the vise, the cam merely opening the latter.

One of the jaws 55, removably mounted in the upper ends of the oscillatory arms 56 of the vise as just described, is provided with a longitudinally extending plunger 67 (see Fig. 15), backed by a compression spring 68 and having a lateral extension 69 at its inner end that projects into the space between the edges, so that as a spindle 20 is moved into the vise, the ferrule A, or other article on such spindle, it will engage such projection. The latter thus forms a resilient stop and serves to force the preliminarily formed ferrule, or equivalent article, into proper longitudinal position on said spindle and to there retain the same until the jaws 55 are closed to firmly grip such article against the spindle. The effect of this gripping action of the vise-jaws is not only to give to the article the proper form or contour, but also to hold the same in proper electrical contact with the spindle, which forms one terminus of the welding circuit that is closed when the electrode is brought into contact with such work. In order to permit the electrode to thus contact with the work, the upper faces of the jaws are cut away, as clearly appears in Fig. 12, so as to leave a corresponding portion of the article exposed. In placing the article on the spindles, such article is so disposed that the overlapping edges $a$ and $a'$ will be thus left exposed in position to be engaged by the electrode. Such electrode is preferably in the form of an annular disk 75, of copper or other good conducting material, detachably secured to one end of a spindle 76 that is rotatably mounted in a journal-box 77. The latter is in turn oscillatorily supported about a stub-shaft 78 disposed at right angles to the axis of said electrode spindle and mounted in a bracket 79 on the machine frame so as to be vertically adjustable, being held in adjusted position by a nut 80, shown in Fig. 1.

It has been previously described, how the one terminal 30 of the transformer secondary is connected through the arm 29 with the work carrier 7 and thus with the individual work-holding spindles 20 on the latter; the other terminal 81 of the transformer secondary is connected with the box 77, which in turn has good electrical contact with the electrode-spindle 76, so that the circuit may be closed by way of such spindle and the electrode 75 carried thereby, through the article on the particular work spindle 20 of the carrier that is in operative position; thence by way of such carrier and the arm 29 to the other terminal 30 of the transformer secondary. It will be understood that insulation is provided at suitable points to prevent deviation of the electric current from the circuit just described; and while it has not been found feasible in the drawings to indicate such insulation at every point, owing to the scale of the drawings, anyone skilled in electrical matters can readily select the suitable points in the machine for the interposition of the necessary insulation material. To rotate the electrode spindle 76, a worm-gear 90 is mounted on its outer end, as shown in Fig. 2, such gear being inclosed by a suitable housing 91 that forms an extension of the box 77 in which the spindle itself is journaled. A transversely disposed worm 92, meshing with such gear 90, is mounted on a shaft 93 that is journaled in the upper portion of this casing and projects forwardly therefrom, carrying on its outer end a grooved pulley 94. One end of a round belt 95 passes around this pulley, the other end of such belt passing around a similar sheave or pulley 96 on the same motor-driven shaft 11 from which belt 12 is driven, the belt 95 being carried around the corner of the machine on idler pulleys 97, as shown in Fig. 1. By reason of the flexible driving connections thus provided, it will be seen that the electrode-spindle 76 may be oscillated about its transverse supporting axis 78, without interfering with the rotation of the spindle or of the electrode, it being designed that the latter should be continuously rotated at a sufficient rate of speed to present a constantly changing portion of its edge in position to contact with the work. Normally the end of the shaft bearing the electrode 75 is held in depressed position by means of a lever 100 pivotally linked to the machine frame at 101 (see Figs. 1 and 7), and carrying a counterweight 102 at its outer end, its inner end being connected with a sleeve or collar 103 surrounding the spindle at a point adjacent to the electrode. Connected with this same collar, is a second lever 104 pivoted to the machine frame at 105 and connected with the inner end of a rock-shaft 106 by means of a rod or link 107, so that upon proper oscillation of said shaft the lever will be pushed upwardly and the spindle with the electrode thereby raised against the action of the counterweight on lever 100. Actuation of said rock-shaft 106 to thus raise the electrode is effected by a second radial cam 108 near the inner edge of the same drum 6, which carries the cam-plates 53 for reciprocating the vise-slide 50, and the previously described radial cam 63, which serves to open the jaws of said vise, such second radial cam 108 being arranged to periodically engage a roller 109 on a lever arm 110 mounted on the outer end of the rock-shaft 106 as shown in Fig. 5. The timing of this second radial cam 108 is such that the electrode 75 is lowered onto the work by the roller 109 running off of cam 108, immediately following the closing of the vise by the spring 65 as the first radial cam 63 leaves roller 64, and one of the cam-plates 53 on the same drum thereupon immediately begins to force the work carrier 7 against spring 36, so as to slowly move the particular work spindle 20 with which the electrode has thus been brought into operative relation, to the right from the normal position shown in Figs. 1 and 2. By the combination of this longitudinal movement of the work on the work spindle with the rotary movement of the electrode, which contacts with such work, a double relative movement of the electrode and work are secured, the effect being to cause the electrode to move in a diagonal or helical line with respect to the work spindle.

It will be understood that the disposition of the overlapping edges $a$ of article A being welded is such that the direction of rotation of the electrode will be with and not against the outside, or exposed, edge. Accordingly, the effect of the electrode, when a heating electric current is passing from the same through such overlapping edges of an article to the work spindle supporting the latter, or vice versa, is to fuse such overlapping edges and at the same time to smooth down the outer of such edges so as to leave practically no offset along the line of the weld in the finished article. To further assist in thus smoothing down the freshly welded joint on the article, and also to insure the thoroughness of the weld itself, a hammering device is provided, such device being disposed closely adjacent to the inner face of the electrode, as shown in Fig. 2. The detailed construction of this device is further illustrated in Figs. 8, 9 and 10, from which it will be seen to comprise in effect a disk 115, freely rotatably mounted near one end of an arm 116 that is oscillatory on a shaft 117 extending lengthwise of the machine frame. This shaft 117 is arranged to be periodically oscillated by means of a radial cam 118 on the drum 5 at the right-hand end of the machine, as illustrated in Figs. 1 and 2, such cam co-acting with a roller 119 on one arm of a bell-crank 120, the other arm of which is forked to engage an eccentric pin 121 on the corresponding end of the shaft. A tension spring 122 serves to retain the roller 119 in contact with the face of the cam drum, while a second spring 123 tends to turn the rock shaft in a direction to depress the arm 116 that carries the hammer, the action of the cam 118 being, conversely, to turn the shaft in the opposite direction and raise the hammer.

Connected with the outer end of the hammer-bearing arm 116, by means of a ball and socket or equivalent universal joint 124, is a pitman rod 125 of adjustable length, the upper end of which is pivoted to an eccentric pin 126 on a weighted disk 127 that forms one side of a pulley 128, said disk and pulley being mounted on an extension of the motor spindle 9. By reason of the pitman connection with this disk, the arm 116 carrying the hammer 115 will obviously be rapidly reciprocated in a substantially vertical direction, and so, whenever depressed, will deliver a quick succession of blows on an article supported on the particular spindle 20 that happens to be positioned beneath said hammer. As previously stated, this hammer 115 is located closely adjacent to the face of the electrode 75, so that as the spindle with the work thereon is retracted, that is moved to the right as shown in Figs. 1 and 2, by the action of the cam drum at the other end of the machine, not only will the electrode contact with the seam to be welded but immediately following such contact by the electrode, the hammer will deliver a rapid succession of blows along the freshly welded seam, thereby forcing the edges, while still at a welding temperature, more closely together and smoothing down any irregularities on the outer surface of the article, which may have been left by the action of the electrode. The hammer, being freely rotatable on the arm, will by reason of this fact and the eccentric axis about which the arm oscillates, be caused to continually present a fresh portion of its edge to the work so as to prevent the latter from becoming unduly worn in one place, as well as to prevent such edge from becoming unduly heated by reason of its contact with the freshly welded seam.

The pulley 128 mounted, as stated, adjacently to the weighted disk 127, which serves to operate the hammer 115 through the pitman connection 125, is connected to drive a spindle 130 by means of a belt 131 and a second pulley 132 on such spindle. The latter is journaled in suitable bearings 133 at the rear of the machine frame and carries a rotary brush 134, preferably of wire strand type, which by suitable adjustment of said bearings may be brought into position to contact with the welding electrode. By means of such brush 134, the edge of such electrode will be smoothed down and polished as it is rotated about its appropriate axis, and thus at all times present a clean face for contact with the work.

As previously indicated, the most convenient location for the transformer 31 is found by locating the same above the machine frame so that its respective secondary terminals 30 and 81, which are joined to the arm 29 connected with the work carrier 7 and to the spindle 76 that carries the welding electrode 75, may be as short as possible. The leads 140 of the external circuit, which supply current to the primary of said transformer are shown as entering the machine base, although their disposition is a matter of indifference except that one of said leads includes an automatic switch 141 whereby the current to the transformer may be controlled. This switch, in the construction shown in the drawings (see Figs. 1 and 2), is mounted at the left end of the machine frame adjacent to the corresponding cam 6 on the main shaft 3. As a matter of convenience a second manually operable switch 142 shown as of the knife type, is located adjacent to such automatic switch 141 for cutting out the current when it is desired to entirely suspend operation of the machine.

The automatic switch 141 as shown in enlarged detail in Figs. 16, 17 and 17ª, comprises essentially a rocker 143, one arm of which carries a contact 144 that is adapted to close with a contact 145 carried by a second arm 146 pivotally attached to such first arm. This second arm is normally drawn toward the first arm to close such contacts by means of a spring 147, but when rocker 143 is oscillated from the position shown in Fig. 17 to that shown in Fig. 17ª, a pin 148 acts as a stop to limit movement of the pivotal arm 146, and thus separates said contacts. When the rocker 143 is oscillated to bring the contact carried by the arm thereof against the contact on said pivotal arm, too forceful a contact will be prevented and at the same time a sufficient pressure always assured by the action of said spring. The rocker has a second arm carrying a roller 149 at its outer end, which engages with a star-shaped cam 150 rotatably mounted adjacent to one edge of the cam drum 6, the latter being provided with two laterally projecting lugs or pins 151 secured to such edge so as to be adapted to engage with successive teeth on a toothed wheel 152 mounted adjacent to said cam and secured to the same so as to rotate the latter. In the normal position of the cam, as shown in Fig. 17, the roller 149 on the end of the rocker arm will rest in one of the concavities of cam 150 and thereby position the rocker so as to close the contact 144 with the contact 145, a weight 153, or equivalent means, connected with said rocker serving to hold such roller in contact with the cam at all times. With the cam in this position, the effect of the engagement of one of the lugs 151 on the drum 6 with a tooth on the wheel 152 will be to rotate the latter just sufficiently to bring one of the convex portions of the cam 150 under the roller 149, thereby oscillating the rocker an amount sufficiently to separate the contacts 144 and 145. The second lug 151 on the drum will, in turn, bring the roller into engagement with a concave section of the cam and so cause the contacts to close again.

As a result of the construction of the automatic switch 141 just described, it will be seen that each rotation of the main shaft 3 and of the drum 6 carried thereby will cause said switch to close the circuit through the transformer primary, and then to break such circuit, the arrangement of the lugs being such that the circuit is thus closed only while the welding electrode is disposed in operative relation to the work, that is while said electrode contacts with an article on the work spindle disposed therebeneath. As soon as such spindle has been moved entirely past the electrode so the latter may be raised, the current is switched off only to be thrown in when the next successive work spindle is presented in proper position for the action of the electrode. The current for the motor 8 will preferably not be derived from the same leads 140, which supply current to the transformer, and in any event a separate switch 160 (Fig. 1) is, of course, provided for controlling the operation of such motor and thereby the operation of the several devices and mechanisms combined in the apparatus.

Having thus described, with what is considered sufficient particularity, the construction and mode of operation of these several component devices and mechanisms, the general mode of operation of the apparatus as a whole may be now set forth. Assuming the manually operable switch 142, which controls the supply of current to the transformer to be closed, as also the switch 160 which throws the motor in circuit, it will be obvious that the main shaft 3 of the machine will be set in rotation as well as the spindle 76, which carries the electrode 75, the reduction in speed in the case of the latter being considerably greater than in the case of the former, since such electrode requires only to have a relatively low speed of rotation. At the same time the pulley 128 which drives the polishing brush 134 and the weighted disk 127, which operates the reciprocating hammer 115 are set in motion, the rate of reciprocation of said hammer and the speed of rotation of such brush being relatively higher. As the main spindle of the machine is thus rotated, the operator places the preliminarily formed tubes or ferrules A on successive spindles 20 with the seams disposed radially outward, so that they will lie on the upper faces of the spindles, that is, in a line parallel with the axis of the carrier 7 and shaft 3, when said spindles are brought into coöperative relation with the vise, electrode and hammer. The articles to be welded may be thus placed on the work spindles without regard to the longitudinal position of the carrier on the main shaft, it being understood that the latter is normally maintained in the advanced position shown in Figs. 1 and 2 by the spring 36, and then periodically retracted or moved to the right. Such periodic movement of the carrier to the right, is effected by the cam-plate 53 on the cam-drum 6, marked "Welding cam" on Fig. 18, through the medium of the bar 52 and roller 54 thereon disposed to be engaged by such cam, the vise-jaws 55 being thereupon closed around the particular spindle that happens to lie in operative position so as to firmly grip the work carried thereby and thus operatively connect the vise-slide with said spindle and carrier, so that movement of the former is imparted to the latter. When the work carrier has been thus retracted, or moved to the right the full distance, as determined by the throw of the welding cam 53 on drum 6, the roller 34 on the bar 33 will be engaged between the two cam-plates 35 on cam-drum 5 marked "Spindle stop" on Fig. 19. These cam-plates lie parallel with each other and serve to hold the carrier and work spindles against longitudinal movement during the period of engagement of the roller therewith. While the carrier is thus being held, the vise jaws 55 are opened and retracted, that is moved to the left from the position, to which they had been advanced as just described, back to the normal position shown in Figs. 1 and 2, this movement being performed by the cam-plates 53 on cam-drum 6 marked "Vise return cam" on Fig. 18. Also while the carrier is thus held, the continued rotation of the drum 5 causes the pawl 43 to be brought into en- gagement with the ratchet wheel 42 by reason of the coaction of the trip 46 with the arm 45, the carrier being thus rotated through an arc equal to the angular distance between successive spindles so as to bring the next successive spindle with the article previously placed thereon into operative position, that is in alinement with the opened and retracted vise-jaws 55. The spring-pressed plungers 40, it will be understood, hold the carrier against rotation except when the pawl-and-ratchet device is operated, as just described. Assuming the carrier and the vise jaws both to be thus retracted, and a fresh spindle with article thereon in operative position as just described, the carrier will be positively advanced by the cam-plates 35 on drum 5 marked "Spindle return cam" on Fig. 19, this action being assisted of course by the spring 36, which is under tension when the bar 33 is in its extreme right position. Thereupon the carrier is left undisturbed for the time being by the cam drum 5, the relative positions of the work-spindle, electrode and hammer, as well as of the automatic switch 141, being shown in Fig. 20. Since, however, such advance movement of the carrier has reached its limit, the rocker arm 62 is oscillated by roller 64 leaving the radial cam 63 on drum 6 so as to close the jaws 55 of the vise upon the article mounted upon the operatively positioned spindle, thereby bringing such article into close fitting contact with the spindle so as to give the same its proper shape and at the same time insure a thorough electrical connection between the article and the spindle. The rock-shaft that allows the electrode to be lowered is next oscillated by the other radial cam on drum 6 so that the electrode 75 is brought into contact with the outer overlapping edge of the article at the inner end of the seam and at the same time the reciprocating hammer 115 is lowered by the action of the radial cam 118 on the first-mentioned drum, which oscillates the shaft 117 sufficiently to accomplish this result. The relative positions of the operative parts in question at this stage in the operation is shown in Fig. 21. The primary circuit of the transformer is at the same time automatically closed through the action of the switch 141 at the left end of the machine as viewed in Figs. 1 and 2. No sooner is the electrode thus brought into contact with the work and the current supplied to the transformer closed, than retraction of the work carrier begins under the action of the "welding cam" on drum 6, so as to bring successive portions of the seam into contact with said electrode and with the hammer, which follows closely after. The effect of the rotation of the electrode, combined with this longitudinal movement of the article, as previously described, is to cause the electrode to move diagonally with respect to the line of the seam and thereby more effectively press and smooth down such seam, the thorough welding and smoothing down of the edges being insured by the action of the hammer.

When the outer end of the article on the spindle has been reached, (see Fig. 22) the primary circuit of the transformer is automatically broken by means of the same switch 141, the particular lug or projection 151 on the cam-drum 6 which controls this action of such switch being adjusted to effect such breaking at the proper moment so as to avoid waste of current. Immediately thereafter, or simultaneously, as the case may be, the electrode together with the hammer is raised, the vise-jaws 55 are opened, and the slide 50 carrying the latter is returned to its starting point, that is, is retracted to the left as shown in the figures of reference, where it remains ready to receive another work spindle with the article to be welded thereon. The work carrier is left in its retracted position at the right long enough to be rotated to bring the next preliminarily formed article into alinement with the vise, and then the foregoing series of operations will be repeated and so on indefinitely. As the welding electrode rotates, successive portions of its periphery, or edge, are brought into contact with the polishing brush 134 which clears off any scale and also assists in smoothing such edge, so that when the latter is brought into contact with the work on the operatively positioned carrier-spindle, effective electrical contact is insured, as well as the absence of scale or dirt in the seam. It will be understood that suitable automatic means (not shown) may be provided for removing the articles as they are thus successively brought to the rear of the machine in finished form.

By means of the foregoing apparatus and particularly by the manner in which the welding electrode contacts with the work and by the combination with such welding electrode of hammering means, as hereinbefore described, I am enabled to weld together the edges of a much thinner sheet than has heretofore been deemed possible, producing a continuous seam without burning or damaging the edges. At the same time a smoothly finished, perfect joint is obtained, one that is not only of satisfactory strength but gratifying in appearance as well. In addition to the foregoing, the general combination of the devices and mechanisms in the apparatus as described, permits of the automatic welding of articles of the general class in question at a speed heretofore never attained so far as I am aware, it being obvious that, by the use of the plurality of spindles on the work carrier, practically the only limit on the rate of production is that imposed by the speed of the welding operation itself, all the other steps being capable of rapid performance. A machine or apparatus of the kind illustrated may be readily operated by a single workman, since, once the apparatus is started, all that is required is that the preliminarily formed articles be placed on the successive spindles of the work carrier, all the other operations being automatic.

It will be understood, particularly as regards the process or method involved in the use of my improved apparatus, that such method or process is not necessarily limited to the welding of tubular articles, since metallic articles which can have the surfaces, that are to be welded, brought together in analogous fashion to that above described, can be advantageously welded by supporting such article on a suitable mandrel and so relatively moving said mandrel and the coöperating electrode, after the latter has been brought into contact with the article, as to, in effect, move the electrode not only along the seam but also transversely of the same. For the purpose of this specification and the following claims, accordingly, the respective edge portions of the tube may be regarded, if desired, as two metallic articles, although they form part of the same tube in the case of the article selected for illustration purposes.

Other modes of applying the principle of my invention may be employed instead of the one explained, change being made as regards the steps or mechanism herein disclosed, provided the means stated by any of the following claims or the equivalent of such stated means be employed.

I therefore particularly point out and distinctly claim as my invention:—

1. The method of electrically welding an article, which consists in suitably supporting the same on a mandrel constituting one terminal of a heating electric circuit; then passing an electrode, which constitutes the other terminal of such circuit, along the seam of such article and simultaneously positively moving such electrode across such article.

2. The method of electrically welding articles of tubular form, which consists in fitting the preliminarily formed article onto a mandrel constituting one terminal of a heating electric circuit; and then passing an electrode, which constitutes the other terminal of such circuit, along the seam of such article, the electrode and article being given a positive double relative movement.

3. The method of electrically welding articles of tubular form, which consists in fitting the preliminarily formed article onto a mandrel constituting one terminal of a heating electric circuit; and then passing an electrode, which constitutes the other terminal of such circuit, along the seam of such article, the electrode and article being given a positive double relative movement so as to cause said electrode to move in a diagonal or helical line with respect to such article.

4. The method of electrically welding articles of tubular form, which consists in fitting the preliminarily formed article onto a mandrel constituting one terminal of a heating electric circuit; bringing an electrode, which constitutes the other terminal of such circuit, into contact with the seam of such article; and then simultaneously positively moving said electrode and article relatively to each other transversely and longitudinally of such seam.

5. The method of electrically welding articles of tubular form, which consists in fitting the preliminarily formed article onto a mandrel constituting one terminal of a heating electric circuit; bringing an electrode, which constitutes the other terminal of such circuit, into contact with the seam of such article; and then simultaneously positively moving said electrode transversely of such seam, and moving said electrode and article relatively to each other longitudinally of such seam.

6. The method of electrically welding articles of tubular form, which consists in fitting the preliminarily formed article onto a mandrel constituting one terminal of a heating electric circuit; bringing an electrode, which constitutes the other terminal of such circuit, into contact with the seam of such article; and then simultaneously positively moving said electrode transversely of such seam, and moving such article relatively to said electrode longitudinally of such seam.

7. The method of electrically welding articles of tubular form, which consists in fitting the preliminarily formed article onto a mandrel constituting one terminal of a heating electric circuit; bringing a rotatable electrode, which constitutes the other terminal of such circuit, into contact with the seam of such article, the axis of said electrode being substantially parallel with such seam; positively rotating said electrode; and simultaneously moving said electrode and article relatively to each other longitudinally of such seam.

8. The method of electrically welding articles of tubular form, which consists in fitting the preliminarily formed article onto a mandrel constituting one terminal of a heating electric circuit; bringing a rotatable electrode, which constitutes the other terminal of such circuit, into contact with the seam of such article, the axis of said electrode being substantially parallel with such seam; positively rotating said electrode; and simultaneously moving said article relatively to such electrode longitudinally of such seam.

9. The method of electrically welding the overlapping edges of an article, which consists in suitably supporting such edges on a mandrel constituting one terminal of a heating electric circuit; passing an electrode, which constitutes the other terminal of such circuit, along such edges, so as to raise the same to a welding temperature; and thereupon progressively hammering such edges together immediately following the passage of such electrode.

10. The method of electrically welding the overlapping edges of an article, which consists in suitably supporting such edges on a mandrel constituting one terminal of a heating electric circuit; passing an electrode, which constitutes the other terminal of such circuit, along such edges, the electrode and article being given a double relative movement; and thereupon hammering such edges together.

11. The method of electrically welding articles of tubular form, which consists in fitting the preliminarily formed article with its edges overlapping onto a mandrel, which constitutes one terminal of a heating electric circuit; passing an electrode, which constitutes the other terminal of such circuit, along such edges, so as to raise the same to a welding temperature; and thereupon progressively hammering such edges together immediately following the passage of such electrode.

12. The method of electrically welding articles of tubular form, which consists in fitting the preliminarily formed article with its edges overlapping onto a mandrel, which constitutes one terminal of a heating electric circuit; passing an electrode, which constitutes the other terminal of such circuit, along such edges; the electrode and article being given a double relative movement; and thereupon hammering such edges together, while still resting on said mandrel.

13. The method of electrically welding articles of tubular form, which consists in fitting the preliminarily formed article with its edges overlapping onto a mandrel, which constitutes one terminal of a heating electric circuit; bringing an electrode, which constitutes the other terminal of such circuit, into contact with the outer of such edges; simultaneously moving said electrode and article relatively to each other both transversely and longitudinally of such edges; and thereupon hammering such edges together, while still resting on said mandrel.

14. The method of electrically welding articles of tubular form, which consists in fitting the preliminarily formed article with its edges overlapping onto a mandrel, which constitutes one terminal of a heating electric circuit; bringing an electrode, which constitutes the other terminal of such circuit, into contact with the outer of such edges; simultaneously moving said electrode transversely of, and in the same direction as, such outer edge, and moving said electrode and article relatively to each other longitudinally of such edge; and thereupon hammering such edges together, while still resting on said mandrel.

15. The method of electrically welding articles of tubular form, which consists in fitting the preliminarily formed article with its edges overlapping onto a mandrel, which constitutes one terminal of a heating electric circuit; bringing an electrode, which constitutes the other terminal of such circuit, into contact with the outer of such edges; simultaneously moving said electrode transversely of, and in the same direction as, such outer edge, and moving such article relatively to said electrode longitudinally of such edge; and thereupon hammering such edges together, while still resting on said mandrel.

16. In mechanism of the character described, the combination of a work-supporting member, constituting one terminal of a heating electric circuit; an electrode, which constitutes the other terminal of such circuit, adapted to contact with the article supported on said member, and means adapted to impart a positive double relative movement to said member and electrode.

17. In mechanism of the character described, the combination of a work-supporting member, constituting one terminal of a heating electric circuit; an electrode, which constitutes the other terminal of such circuit, movable toward and away from said member, so as to contact, when desired, with an article supported thereon; and means adapted to impart a positive double relative movement to said member and electrode.

18. In mechanism of the character described, the combination of a work-supporting member movable in a rectilinear direction, constituting one terminal of a heating electric circuit; an electrode, which constitutes the other terminal of such circuit, movable toward and away from said member, so as to contact, when desired, with an article supported thereon, said member being also movable transversely of said member when thus in contact with such article and positively acting means adapted thus to move said electrode and member.

19. In mechanism of the character described, the combination of a work-supporting member movable in a rectilinear direction, constituting one terminal of a heating electric circuit; an electrode, which constitutes the other terminal of such circuit, movable toward and away from said member, so as to contact, when desired, with an article supported thereon, said member being also movable transversely of said member when thus in contact with such article; and positively acting means adapted simultaneously to move said member as described and thus transversely move said electrode.

20. In mechanism of the character described, the combination of a work-supporting member movable in a rectilinear direction, constituting one terminal of a heating electric circuit; an electrode, which constitutes the other terminal of such circuit, movable toward and away from said member, so as to contact, when desired, with an article supported thereon, said member being also movable transversely of said member when thus in contact with such article; and positively acting means adapted successively to move said electrode toward said member into contact with such article, thereupon simultaneously move said member as described, and thus transversely move said electrode, and finally move the latter away from said member.

21. In mechanism of the character described, the combination of a work-supporting member, constituting one terminal of a heating electric circuit; a rotatable electrode, which constitutes the other terminal of such circuit, adapted to contact with an article supported on said member, and means adapted to positively rotate said electrode while thus in contact with such article.

22. In mechanism of the character described, the combination of a work-supporting member movable in a rectilinear direction and constituting one terminal of a heating electric circuit, and a rotatable electrode, which constitutes the other terminal of said circuit, adapted to contact with an article supported on said member; and means adapted to positively rotate said electrode while in contact with such article.

23. In mechanism of the character described, the combination of a work-supporting member movable in a rectilinear direction and constituting one terminal of a heating electric circuit, and a rotatable electrode, which constitutes the other terminal of said circuit, adapted to contact with an article supported on said member, the axis of rotation of said electrode being substantially parallel with respect to the line of movement of said member; and means adapted to positively rotate said electrode while in contact with such article.

24. In mechanism of the character described, the combination of a work-supporting member movable in a rectilinear direction and constituting one terminal of a heating electric circuit, and a rotatable electrode, which constitutes the other terminal of said circuit, adapted to contact with an article supported on said member, the axis of rotation of said electrode being substantially parallel with respect to the line of movement of said member; and means adapted simultaneously to move said member as described, and thus positively to rotate said electrode.

25. In mechanism of the character described, the combination of a mandrel adapted to support a preliminarily formed tubular article having a seam to be welded, said mandrel constituting one terminal of a heating electric circuit; an electrode, which constitutes the other terminal of such circuit, adapted to contact with the seam of such article, and means adapted to impart a positive double relative movement to said member and electrode.

26. In mechanism of the character described, the combination of a mandrel adapted to support a preliminarily formed tubular article having a seam to be welded, said mandrel constituting one terminal of a heating electric circuit; an electrode, which constitutes the other terminal of such circuit, adapted to contact with the seam of such article; and means adapted simultaneously to positively move said electrode transversely of such seam, and to move said electrode and mandrel relatively to each other longitudinally of such seam.

27. In mechanism of the character described, the combination of a mandrel adapted to support a preliminarily formed tubular article having a seam to be welded, said mandrel constituting one terminal of a heating electric circuit; a rotatable electrode, which constitutes the other terminal of such circuit, adapted to contact with the seam of an article while thus supported; and means adapted simultaneously to positively rotate said electrode, so as to move the same transversely of such seam, and to move said electrode and mandrel relatively to each other longitudinally of such seam.

28. In mechanism of the character described, the combination of a mandrel adapted to support a preliminarily formed tubular article having a seam to be welded, said mandrel constituting one terminal of a heating electric circuit; a rotatable electrode, which constitutes the other terminal of such circuit, adapted to contact with the seam of an article while thus supported; and means adapted simultaneously to positively rotate said electrode, so as to move the same transversely of such seam, and to move said article relatively to said electrode longitudinally of such seam.

29. In mechanism of the character described, the combination of a work-supporting member, constituting one terminal of a heating electric circuit; an electrode, which constitutes the other terminal of such circuit, adapted to contact with the article supported on said member; means adapted to impart a double relative movement to said member and electrode; and hammer-means adapted to contact with such seam immediately following said electrode.

30. In mechanism of the character described, the combination of a mandrel adapted to support a preliminarily formed tubular article having a seam to be welded, said mandrel constituting one terminal of a heating electric circuit; an electrode, which constitutes the other terminal of such circuit, adapted to contact with the seam of such article; means adapted to impart a double relative movement to said member and electrode; and a hammer disposed adjacent to said electrode and reciprocatory transversely of said mandrel.

31. In mechanism of the character described, the combination of a mandrel adapted to support a preliminarily formed tubular article having a seam to be welded, said mandrel constituting one terminal of a heating electric circuit; an electrode, which constitutes the other terminal of such circuit, adapted to contact with the seam of such article; means adapted simultaneously to move said electrode transversely of such seam, and to move said electrode and mandrel relatively to each other longitudinally of such seam; and a hammer disposed adjacent to said electrode and reciprocatory transversely of said mandrel.

32. In mechanism of the character described, the combination of a mandrel adapted to support a preliminarily formed tubular article having a seam to be welded, said mandrel constituting one terminal of a heating electric circuit; a rotatable electrode, which constitutes the other terminal of such circuit, adapted to contact with the seam of an article while thus supported; means adapted simultaneously to rotate said electrode, so as to move the same transversely of such seam, and to move said electrode and mandrel relatively to each other longitudinally of such seam; and a hammer disposed adjacent to said electrode and reciprocatory transversely of said mandrel.

33. In mechanism of the character described, the combination of a mandrel adapted to support a preliminarily formed tubular article having a seam to be welded, said mandrel constituting one terminal of a heating electric circuit; means adapted to press an article thus supported into forceful contact with said mandrel; an electrode, which constitutes the other terminal of such circuit, adapted to contact with the seam of such article; and means adapted to impart a positive double relative movement to said electrode and mandrel.

34. In mechanism of the character described, the combination of a mandrel adapted to support a preliminarily formed tubular article having a seam to be welded, said mandrel constituting one terminal of a heating electric circuit; means adapted to press an article thus supported into forceful contact with said mandrel; an electrode, which constitutes the other terminal of such circuit, adapted to contact with the seam of such article; and means adapted simultaneously to positively move said electrode transversely of such seam, and to move said electrode and mandrel relatively to each other longitudinally of such seam.

35. In mechanism of the character described, the combination of a mandrel adapted to support a preliminarily formed tubular article having a seam to be welded, said mandrel constituting one terminal of a heating electric circuit; vise-jaws adapted to grip such article and mandrel and press the former into forceful contact with the latter; a rotatable electrode, which constitutes the other terminal of such circuit, adapted to contact with the seam of such article; and means adapted simultaneously to positively rotate said electrode, so as to move the same transversely of such seam, and to move said electrode and mandrel relatively to each other longitudinally of such seam.

36. In mechanism of the character described, the combination of a mandrel adapted to support a preliminarily formed tubular article having a seam to be welded, said mandrel constituting one terminal of a heating electric circuit; vise-jaws adapted to grip such article and mandrel and press the former into forceful contact with the latter; a rotatable electrode, which constitutes the other terminal of such circuit, adapted to contact with the seam of such article; and means adapted simultaneously to positively rotate said electrode, so as to move the same transversely of such seam, and to move said article relatively to said electrode longitudinally of such seam.

37. In mechanism of the character described, the combination of a mandrel adapted to support a preliminarily formed tubular article having a seam to be welded, said mandrel constituting one terminal of a heating electric circuit; means adapted to press an article thus supported into forceful contact with said mandrel; an electrode, which constitutes the other terminal of such circuit, adapted to contact with the seam of such article; means adapted to move said electrode and mandrel relatively to each other longitudinally of such seam; and hammer-means independent of said electrode adapted to contact with such seam immediately following the same.

38. In mechanism of the character described, the combination of a mandrel adapted to support a preliminarily formed tubular article having a seam to be welded, said mandrel constituting one terminal of a heating electric circuit; means adapted to press an article thus supported into forceful contact with said mandrel; an electrode, which constitutes the other terminal of such circuit, adapted to contact with the seam of such article; means adapted to impart a double relative movement to said electrode and mandrel; and a hammer independent of said electrode disposed adjacent to the same and reciprocatory transversely of said mandrel.

39. In mechanism of the character described, the combination of a mandrel adapted to support a preliminarily formed tubular article having a seam to be welded, said mandrel constituting one terminal of a heating electric circuit; vise-jaws adapted to grip such article and mandrel and press the former into forceful contact with the latter; a rotatable electrode, which constitutes the other terminal of such circuit, adapted to contact with the seam of such article; means adapted simultaneously to rotate said electrode, so as to move the same transversely of such seam, and to move said electrode and mandrel relatively to each other longitudinally of such seam; and a hammer disposed adjacent to said electrode and reciprocatory transversely of said mandrel.

40. In mechanism of the character described, the combination of a mandrel adapted to support a preliminarily formed tubular article having a seam to be welded, said mandrel constituting one terminal of a heating electric circuit; an electrode, which constitutes the other terminal of such circuit, adapted to contact with the seam of such article; and automatic means adapted to move said electrode and mandrel relatively to each other to effect such contact and thereupon to pass said electrode along such seam.

41. In mechanism of the character described, the combination of a mandrel adapted to support a preliminarily formed tubular article having a seam to be welded, said mandrel constituting one terminal of a heating electric circuit; an electrode, which constitutes the other terminal of such circuit, said electrode being movable transversely of said mandrel in two different directions, one to effect contact, and the other while in contact, with the seam of an article supported on said mandrel; and automatic means adapted thus successively to move said electrode and thereupon to move said electrode and mandrel relatively to each other longitudinally of such seam.

42. In mechanism of the character described, the combination of a mandrel adapted to support a preliminarily formed tubular article having a seam to be welded, said mandrel constituting one terminal of a heating electric circuit; an electrode, which constitutes the other terminal of such circuit, said electrode being movable transversely of said mandrel in two different directions, one to effect contact, and the other while in contact, with the seam of an article supported on said mandrel; and automatic means adapted thus successively to move said electrode and thereupon to move said mandrel relatively to said electrode longitudinally of such seam.

43. In mechanism of the character described, the combination of a mandrel adapted to support a preliminarily formed tubular article having a seam to be welded, said mandrel constituting one terminal of a heating electric circuit, an electrode of disk-form, which constitutes the other terminal of such circuit, said electrode having a movement of translation toward and from said mandrel and being rotatable when in contact with the seam of an article supported on said mandrel; means adapted to rotate said electrode; and other means adapted automatically to move said electrode thus into contact with such seam and thereupon to move said electrode and mandrel relatively to each other longitudinally of such seam.

44. In mechanism of the character described, the combination of a longitudinally reciprocable mandrel adapted to support a preliminarily formed tubular article having a seam to be welded, said mandrel constituting one terminal of a heating electric circuit; an electrode of disk-form, which constitutes the other terminal of such circuit, said electrode being rotatable about an axis substantially parallel with said mandrel and being bodily movable toward and from the same; means adapted to rotate said electrode; means adapted thus bodily to move said electrode into contact with the seam of an article supported on said mandrel; and means adapted thereupon to reciprocate said mandrel.

45. In mechanism of the character described, the combination of a longitudinally reciprocable mandrel adapted to support a preliminarily formed tubular article having a seam to be welded, said mandrel constituting one terminal of a heating electric circuit; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; means adapted to oscillate said spindle thus bodily to move said electrode into contact with the seam of an article supported on said mandrel; and means adapted thereupon to reciprocate said mandrel.

46. In mechanism of the character described, the combination of a longitudinally reciprocable mandrel adapted to support a preliminarily formed tubular article having a seam to be welded, said mandrel constituting one terminal of a heating electric circuit; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; means tending to oscillate said spindle to move said electrode toward said mandrel into contact with the seam of an article supported thereon; other means adapted periodically to oscillate said spindle to move said electrode away from said mandrel; and means adapted periodically to reciprocate said mandrel.

47. In mechanism of the character described, the combination of a longitudinally reciprocable mandrel adapted to support a preliminarily formed tubular article having a seam to be welded, said mandrel constituting one terminal of a heating electric circuit; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; counterweight means tending to oscillate said spindle to move said electrode toward said mandrel into contact with the seam of an article supported thereon; other means, including a cam, adapted to periodically oscillate said spindle to move said electrode away from said mandrel; and means adapted periodically to reciprocate said mandrel.

48. In mechanism of the character described, the combination of a longitudinally reciprocable mandrel adapted to support a preliminarily formed tubular article having a seam to be welded, said mandrel constituting one terminal of a heating electric circuit; vise-jaws disposed to lie on opposite sides of said mandrel in one position of the latter, said jaws being adapted, when closed, to press the article on said mandrel into forceful contact therewith; an electrode of disk-form, which constitutes the other terminal of such circuit, said electrode being rotatable about an axis substantially parallel with said mandrel and being bodily movable toward and from the same; means adapted to rotate said electrode; and other means adapted automatically successively to advance said electrode between said vise-jaws, actuate the latter to grip the article onto said mandrel, move said electrode into contact with the seam of such article, and thereupon retract said article, so as to pass said electrode, while rotating, longitudinally along such seam.

49. In mechanism of the character described, the combination of a longitudinally reciprocable mandrel adapted to support a preliminarily formed tubular article having a seam to be welded, said mandrel constituting one terminal of a heating electric circuit; vise-jaws disposed to lie on opposite sides of said mandrel in one position of the latter, said jaws being adapted, when closed, to press the article on said mandrel into forceful contact therewith; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; and other means adapted automatically successively to advance said electrode between said vise-jaws, actuate the latter to grip the article onto said mandrel, move said electrode into contact with the seam of such article, and thereupon retract said article, so as to pass said electrode, while rotating, longitudinally along such seam.

50. In mechanism of the character described, the combination of a longitudinally reciprocable mandrel adapted to support a preliminarily formed tubular article having a seam to be welded, said mandrel constituting one terminal of a heating electric circuit; vise-jaws disposed to lie on opposite sides of said mandrel in one position of the latter, said jaws being adapted, when closed, to press the article on said mandrel into forceful contact therewith; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; means tending to oscillate said spindle to move said electrode toward said mandrel into contact with the seam of an article supported thereon; means adapted to periodically oscillate said spindle to move said electrode away from said mandrel; means adapted to periodically reciprocate said mandrel; and means adapted to periodically actuate said vise-jaws to grip an article onto said mandrel.

51. In mechanism of the character described, the combination of a longitudinally reciprocable mandrel adapted to support a preliminarily formed tubular article having a seam to be welded, said mandrel constituting one terminal of a heating electric current; vise-jaws disposed to lie on opposite sides of said mandrel in one position of the latter, said jaws being adapted, when closed, to press the article on said mandrel into forceful contact therewith; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel; means adapted to rotate said spindle; counterweight means tending to oscillate said spindle to move said electrode toward said mandrel into contact with the seam of an article supported thereon; a main drive-shaft; and cams on said shaft adapted periodically to reciprocate said mandrel, oscillate said spindle to move said electrode away from said mandrel, and actuate said vise-jaws to grip an article onto said mandrel.

52. In mechanism of the character described, the combination of a longitudinally reciprocable mandrel adapted to support a preliminarily formed tubular article having a seam to be welded, said mandrel constituting one terminal of a heating electric circuit; an electrode, which constitutes the other terminal of such circuit, said electrode being movable toward and from said mandrel into and out of contact with the seam of an article supported thereon; a reciprocatory hammer likewise movable toward and from said mandrel into and out of contact with such seam; means adapted thus to move said electrode and hammer, respectively; and means adapted to advance and retract said mandrel.

53. In mechanism of the character described, the combination of a longitudinally reciprocable mandrel adapted to support a preliminarily formed tubular article having a seam to be welded, said mandrel constituting one terminal of a heating electric circuit; an electrode, which constitutes the other terminal of such circuit, said electrode being movable toward and from said mandrel into and out of contact with the seam of an article supported thereon; a reciprocatory hammer adjacent to said electrode and likewise movable toward and from said mandrel into and out of contact with such seam; means adapted substantially simultaneously thus to move said electrode and hammer, respectively; and means adapted to advance and retract said mandrel.

54. In mechanism of the character described, the combination of a longitudinally reciprocable mandrel adapted to support a preliminarily formed tubular article having a seam to be welded, said mandrel constituting one terminal of a heating electric circuit; an electrode of disk-form, which constitutes the other terminal of such circuit, said electrode being rotatable about an axis substantially parallel with said mandrel and being bodily movable toward and from the same and into and out of contact with the seam of an article supported thereon; a reciprocatory hammer adjacent to said electrode and likewise movable toward and from said mandrel into and out of operative relation to such seam; means adapted to rotate said electrode; means adapted periodically to move said electrode and hammer into and out of contact with such seam; and means adapted to advance and retract said mandrel.

55. In mechanism of the character described, the combination of a longitudinally reciprocable mandrel adapted to support a preliminarily formed tubular article having a seam to be welded, said mandrel constituting one terminal of a heating electric circuit; vise-jaws disposed to lie on opposite sides of said mandrel in the advanced position of the latter, said jaws being adapted, when closed, to press the article on said mandrel into forceful contact therewith; an electrode of disk-form, which constitutes the other terminal of such circuit, said electrode being rotatable about an axis substantially parallel with said mandrel and being bodily movable toward and from the same into and out of contact with the seam of an article supported thereon; a reciprocatory hammer adjacent to said electrode and likewise movable toward and from said mandrel into and out of operative relation to such seam; means adapted to rotate said electrode; means adapted to advance and retract said mandrel; means adapted to actuate said vise-jaws to grip the article onto said mandrel when the latter is thus advanced; and means adapted to move said electrode and hammer into contact with the seam of such article, when the latter is thus gripped.

56. In mechanism of the character described, the combination of a longitudinally reciprocable mandrel adapted to support a preliminarily formed tubular article having a seam to be welded, said mandrel constituting one terminal of a heating electric circuit; vise-jaws disposed to lie on opposite sides of said mandrel in the advanced position of the latter, said jaws being adapted, when closed, to press the article on said mandrel into forceful contact therewith; a rotatable spindle disposed substantially parallel with said mandrel and carrying at one end an electrode of disk-form, which constitutes the other terminal of such circuit, said spindle being oscillatory about a transverse axis to move said electrode bodily toward and from said mandrel into and out of contact with the seam of an article supported thereon; a reciprocatory hammer adjacent to said electrode and likewise movable toward and away from said mandrel into and out of operative relation to such seam; means tending to oscillate said spindle to move said electrode toward said mandrel; means tending to move said hammer into operative relation to such seam; a main drive-shaft; and cams on said shaft adapted periodically to reciprocate said mandrel, oscillate said spindle to move said electrode away from said mandrel, move said hammer away from said mandrel, and actuate said vise-jaws to grip an article onto said mandrel.

57. In mechanism of the character described, the combination of a movable carrier; a plurality of mandrels on said carrier, each adapted to removably support a preliminarily formed article to be welded and being further adapted to constitute one terminal of a heating electric circuit; and an electrode, which constitutes the other terminal of such circuit, adapted to coöperate with successive mandrels to weld the articles supported thereon.

58. In mechanism of the character described, the combination of a movable carrier; a plurality of mandrels on said carrier, each adapted to removably support a preliminarily formed article to be welded and being further adapted to constitute one terminal of a heating electric circuit; an electrode, which constitutes the other terminal of such circuit, adapted to coöperate with a mandrel on said carrier; and means adapted to intermittently move said carrier to present successive mandrels to said electrode.

59. In mechanism of the character described, the combination of a movable carrier; a plurality of mandrels on said carrier, each adapted to support a preliminarily formed article to be welded, and being further adapted to constitute one terminal of a heating electric circuit; an electrode, which constitutes the other terminal of such circuit, adapted to coöperate with a mandrel on said carrier; means adapted to intermittently move said carrier to present successive mandrels to said electrode; and means adapted thereupon to relatively move said electrode and operatively positioned mandrel.

60. In mechanism of the character described, the combination of a movable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently move said carrier to present successive mandrels to said electrode; and means adapted thereupon to impart a double relative movement to said electrode and operatively positioned mandrel.

61. In mechanism of the character described, the combination of a movable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently move said carrier to present successive mandrels to said electrode; and means adapted thereupon simultaneously to move said electrode and operatively positioned mandrel relatively to each other in two angularly related directions.

62. In mechanism of the character described, the combination of a rotatable carrier; a plurality of mandrels on said carrier, each adapted to removably support a preliminarily formed article to be welded and being further adapted to constitute one terminal of a heating electric circuit; and an electrode, which constitutes the other terminal of such circuit, adapted to coöperate with successive mandrels to weld the articles supported thereon.

63. In mechanism of the character described, the combination of a rotatable carrier; a plurality of mandrels on said carrier, each adapted to removably support a preliminarily formed article to be welded and being further adapted to constitute one terminal of a heating electric circuit; an electrode, which constitutes the other terminal of such circuit, adapted to coöperate with a mandrel on said carrier; and means adapted to intermittently partially rotate said carrier to present successive mandrels to said electrode.

64. In mechanism of the character described, the combination of a rotatable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently partially rotate said carrier to present successive mandrels to said electrode; and means adapted thereupon to relatively move said electrode and operatively positioned mandrel.

65. In mechanism of the character described, the combination of a rotatable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently partially rotate said carrier to present successive mandrels to said electrode; and means adapted thereupon to impart a double relative movement to said electrode and operatively positioned mandrel.

66. In mechanism of the character described, the combination of a rotatable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently partially rotate said carrier to present successive mandrels to said electrode; and means adapted thereupon simultaneously to move said electrode and operatively positioned mandrel relatively to each other in two angularly related directions.

67. In mechanism of the character described, the combination of a rotatable carrier; a plurality of mandrels on said carrier disposed substantially parallel with the latter's axis, each such mandrel being adapted to removably support a preliminarily formed tubular article having a seam to be welded, and being further adapted to constitute one terminal of a heating electric circuit; and an electrode, which constitutes the other terminal of such circuit, adapted to coöperate with successive mandrels to weld the seams of the articles supported thereon.

68. In mechanism of the character described, the combination of a rotatable carrier; a plurality of mandrels on said carrier disposed substantially parallel with the latter's axis, each such mandrel being adapted to removably support a preliminarily formed tubular article having a seam to be welded, and being further adapted to constitute one terminal of a heating electric circuit; an electrode, which constitutes the other terminal of such circuit, adapted to coöperate with a mandrel on said carrier to weld the seam of an article supported thereby; and means adapted to intermittently partially rotate said carrier to present successive mandrels to said electrode.

69. In mechanism of the character described, the combination of a rotatable carrier; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode, which constitutes the other terminal of such circuit, adapted to coöperate with a mandrel on said carrier to weld the seam of an article supported thereby; means adapted to intermittently partially rotate said carrier to present successive mandrels to said electrode; and means adapted thereupon to impart a double relative movement to said electrode and operatively positioned mandrel.

70. In mechanism of the character described, the combination of a rotatable carrier; a plurality of mandrels on said carrier disposed substantially parallel with the latter's axis each such mandrel being adapted to support a preliminarily formed tubular article having a seam to be welded, and being further adapted to constitute one terminal of a heating electric circuit; an electrode, which constitutes the other terminal of such circuit, adapted to coöperate with a mandrel on said carrier to weld the seam of an article supported thereby; means adapted to intermittently partially rotate said carrier to present successive mandrels to said electrode; and means adapted thereupon simultaneously to move said electrode and operatively positioned mandrel relatively to each other in two angularly related directions.

71. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode, which constitutes the other terminal of such circuit, movable toward and away from the path of travel of said mandrels; means adapted thus to move said electrode; means adapted to intermittently partially rotate said carrier to present successive mandrels to said electrode; and means adapted to reciprocate said carrier.

72. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode, which constitutes the other terminal of such circuit, said electrode being movable transversely of an operatively positioned mandrel in two different directions, one to effect contact, and the other while in contact, with the seam of an article supported on such mandrel; means adapted thus to move said electrode; means adapted to intermittently partially rotate said carrier to present successive mandrels to said electrode; and means adapted to reciprocate said carrier.

73. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode of disk-form, which constitutes the other terminal of such circuit, said electrode having a movement of translation toward and from an operatively positioned mandrel and being rotatable when in contact with the seam of an article supported on said mandrel; means adapted to rotate said electrode; means adapted thus to move said electrode toward and from a mandrel; means adapted to intermittently partially rotate said carrier to present successive mandrels to said electrode; and means adapted to reciprocate said carrier.

74. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode of disk-form, which constitutes the other terminal of such circuit, said electrode being rotatable about an axis substantially parallel with that of said carrier and being bodily movable toward and from an operatively positioned mandrel; means adapted to rotate said electrode; means adapted thus to move said electrode toward and from a mandrel; means adapted to intermittently partially rotate said carrier to present successive mandrels to said electrode; and means adapted to reciprocate said carrier.

75. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; a rotatable spindle disposed substantially parallel with the axis of said carrier and carrying at one end an electrode of disk-form, which constitutes the other terminal of such circuit, said spindle being oscillatory about a transverse axis to move said electrode bodily toward and from an operatively positioned mandrel; means respectively adapted to rotate said spindle and to oscillate the same to thus bodily move said electrode; means adapted to intermittently partially rotate said carrier to present successive mandrels to said electrode; and means adapted to reciprocate said carrier.

76. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; vise-jaws disposed to lie on opposite sides of a mandrel in one position of said carrier, said jaws being adapted, when closed, to press the article on said mandrel into forceful contact therewith; an electrode which constitutes the other terminal of such circuit, said electrode being movable toward and away from a mandrel positioned between said vise-jaws; means adapted periodically thus to move said electrode; means adapted periodically to actuate said vise-jaws; means adapted to intermittently partially rotate said carrier to present successive mandrels to said electrode; and means adapted to reciprocate said carrier.

77. In mechanism of the character described, the combination of a rotatable carrier, said carrier being also reciprocable longitudinally of its axis; a plurality of mandrels on said carrier disposed substantially paralled with the latter's axis, each such mandrel being adapted to support a preliminarily formed tubular article having a seam to be welded, and being further adapted to constitute one terminal of a heating electric circuit; vise-jaws disposed to lie on opposite sides of a mandrel in one position of said carrier, said jaws being adapted, when closed, to press the article on said mandrel into forceful contact therewith; an electrode of disk form, which constitutes the other terminal of such circuit, said electrode being rotatable about an axis substantially parallel with that of said carrier, and being bodily movable toward and away from a mandrel positioned between said vise-jaws; means respectively adapted to rotate said electrode and periodically thus to move the same; means adapted periodically to actuate said vise-jaws; means adapted to intermittently partially rotate said carrier to present successive mandrels to said electrode; and means adapted to reciprocate said carrier.

78. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; vise-jaws disposed to lie on opposite sides of a mandrel in one position of said carrier, said jaws being adapted, when closed, to press the article on said mandrel into forceful contact therewith; a rotatable spindle disposed substantially parallel with the axis of said carrier and carrying at one end an electrode of disk-form, which constitutes the other terminal of such circuit, said spindle being oscillatory about a transverse axis to move said electrode bodily toward and from a mandrel positioned between said vise-jaws; means respectively adapted to rotate said spindle and periodically to oscillate the same to thus bodily move said electrode; means adapted periodically to actuate said vise-jaws; means adapted to intermittently partially rotate said carrier to present successive mandrels to said electrode; and means adapted to reciprocate said carrier.

79. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; an electrode, which constitutes the other terminal of such circuit, movable toward and away from the path of travel of said mandrels; a reciprocatory hammer similarly movable toward and away from such path; means respectively adapted thus to move said electrode and hammer; means adapted to intermittently partially rotate said carrier to present successive mandrels to said electrode; and means adapted to reciprocate said carrier.

80. In mechanism of the character described, the combination of a rotatable carrier, said carrier being also reciprocable longitudinally of its axis; a plurality of mandrels on said carrier disposed substantially parallel with the latter's axis, each such mandrel being adapted to support a preliminarily formed tubular article having a seam to be welded, and being further adapted to constitute one terminal of a heating electric circuit; vise-jaws disposed to lie on opposite sides of a mandrel in one position of said carrier, said jaws being adapted, when closed, to press the article on said mandrel into forceful contact therewith; an electrode which constitutes the other terminal of such circuit, said electrode being movable toward and away from a mandrel positioned between said vise-jaws; a reciprocatory hammer similarly movable toward and away from a mandrel thus positioned; means respectively adapted thus to move said electrode and hammer; means adapted to intermittently partially rotate said carrier to present successive mandrels to said electrode; and means adapted to reciprocate said carrier.

81. In mechanism of the character described, the combination of a longitudinally reciprocable mandrel adapted to support the article to be welded; means adapted to move said mandrel in one direction; and a vise adapted to grip such article to said mandrel and thereupon move the latter in the opposite direction.

82. In mechanism of the character described, the combination of a longitudinally reciprocable mandrel adapted to support a preliminarily formed tubular article having a seam to be welded; a vise reciprocable in the same direction as said mandrel and including jaws disposed to lie on opposite sides of said mandrel, said jaws being adapted, when closed, to press the article on said mandrel into forceful contact therewith; means adapted to reciprocate said mandrel in one direction; means adapted to actuate said vise-jaws to grip an article onto said mandrel; and means adapted to reciprocate said vise, and thereby said mandrel, in the opposite direction.

83. In mechanism of the character described, the combination of a longitudinally reciprocable mandrel adapted to support a preliminarily formed tubular article having a seam to be welded; a vise reciprocable in the same direction as said mandrel and including two pivotally connected jaws disposed to lie on opposite sides of said mandrel, said jaws being adapted, when closed, to press the article on said mandrel into forceful contact therewith; means adapted to reciprocate said mandrel in one direction; means adapted to actuate said vise-jaws to grip an article onto said mandrel, said means including a rotatable cam between said jaws and a rocker adapted to actuate said cam irrespective of the position of said vise; and means adapted to reciprocate said vise, and thereby said mandrel, in the opposite direction.

84. In mechanism of the character described, the combination of a rotatable carrier; and a mandrel on said carrier for supporting a preliminarily formed tubular article of taper-shape, said mandrel being of corresponding taper-shape and disposed so that the outer edge of its tapered surface lies substantially parallel with the axis of said carrier.

85. In mechanism of the character described, the combination of a rotatable carrier; and a plurality of mandrels on said carrier for supporting preliminarily formed tubular articles of taper-shape, said mandrels being of corresponding taper-shape and disposed so the outer edges of their tapered surfaces lie substantially parallel with the axis of said carrier.

86. In mechanism of the character described, the combination of a rotatable carrier in the form of a disk or spider having a series of transverse sockets about its periphery; and a plurality of mandrels detachably secured in such sockets so as to project laterally from said carrier.

87. In mechanism of the character described, the combination of a rotatable carrier in the form of a disk or spider having a series of transverse sockets about its periphery; and a plurality of mandrels for supporting preliminarily formed tubular articles of taper-shape, said mandrels being of corresponding taper-shape and being detachably secured in such sockets so as to project laterally from said carrier with the outer edges of their surfaces lying substantially parallel with the axis of said carrier.

88. In mechanism of the character described, the combination of a shaft; a carrier both rotatably and reciprocably mounted thereon; a plurality of mandrels on said carrier for supporting preliminarily formed tubular articles having a seam to be welded; an electrode adapted to coöperate with successive mandrels to weld the seam of the article supported thereon; means normally holding said carrier against rotation; a cam-drum on said shaft connected to reciprocate said carrier; and means adapted to partially rotate said carrier, said means being operative only in the retracted position of the latter.

89. In mechanism of the character described, the combination of a shaft; a carrier both rotatably and reciprocably mounted thereon; a plurality of mandrels on said carrier for supporting preliminarily formed tubular articles having a seam to be welded; an electrode adapted to coöperate with successive mandrels to weld the seam of the article supported thereon; a spring-pressed plunger normally holding said carrier against rotation; a cam-drum on said shaft connected to advance and retract said carrier; a normally inoperative pawl carried by said drum and adapted to engage and partially rotate said carrier in the retracted position of the latter; and a trip adapted to engage said pawl and render the same operative once during each rotation of said drum.

90. In mechanism of the character described, the combination of a shaft; a carrier both rotatably and reciprocably mounted thereon; a plurality of mandrels on said carrier for supporting preliminarily formed tubular articles having a seam to be welded; an electrode adapted to coöperate with successive mandrels to weld the seam of the article supported thereon; a vise reciprocable longitudinally of said shaft and adapted to grip an article onto a mandrel operatively positioned with respect to said electrode; means controlling the gripping action of said vise; and means adapted to advance said vise while thus gripping an article, whereby said carrier is reciprocated in one direction.

91. In mechanism of the character described, the combination of a shaft; a carrier both rotatably and reciprocably mounted thereon; a plurality of mandrels on said carrier for supporting preliminarily formed tubular articles having a seam to be welded; an electrode adapted to coöperate with successive mandrels to weld the seam of the article supported thereon; a vise reciprocable longitudinally of said shaft and adapted to grip an article onto a mandrel operatively positioned with respect to said electrode; means controlling the gripping action of said vise; a cam-drum on said shaft adapted to advance said vise while thus gripping an article, whereby said carrier is retracted; and a second cam-drum adapted to advance said carrier when said vise is inactive.

92. In mechanism of the character described, the combination of a shaft; a carrier both rotatably and reciprocably mounted thereon; a plurality of mandrels on said carrier for supporting preliminarily formed tubular articles having a seam to be welded; an electrode adapted to coöperate with successive mandrels to weld the seam of the article supported thereon; a vise reciprocable longitudinally of said shaft and adapted to grip an article onto a mandrel operatively positioned with respect to said electrode; means controlling the gripping action of said vise; a cam-drum on said shaft adapted to advance said vise while thus gripping an article, whereby said carrier is retracted; means adapted to partially rotate said carrier, when thus retracted; and a second cam-drum adapted thereupon to advance said carrier, said vise being inactive.

93. In mechanism of the character described, the combination of a movable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently move said carrier to present successive mandrels to said electrode; and circuit controlling means adapted to close the circuit through successive mandrels and electrode when coöperatively positioned.

94. In mechanism of the character described, the combination of a movable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently move said carrier to present successive mandrels to said electrode; and automatic circuit controlling means adapted to close the circuit through successive mandrels and said electrode when coöperatively positioned.

95. In mechanism of the character described, the combination of a rotatable carrier; a plurality of mandrels on said carrier, each adapted to support a preliminarily formed article to be welded and being further adapted to constitute one terminal of a heating electric circuit; an electrode, which constitutes the other terminal of such circuit, adapted to coöperate with a mandrel on said carrier; means adapted to intermittently partially rotate said carrier to present successive mandrels to said electrode; and automatic circuit-controlling means adapted to close the circuit through successive mandrels and said electrode when coöperatively positioned.

96. In mechanism of the character described, the combination of a shaft; a carrier both rotatably and reciprocably mounted thereon; a plurality of mandrels on said carrier for supporting preliminarily formed tubular articles having a seam to be welded, an electrode adapted to coöperate with successive mandrels to weld the seam of the article supported thereon, said electrode and carrier being connected in a heating electric-circuit; a cam-drum on said shaft connected to reciprocate said carrier; means adapted to partially rotate said carrier, said means being operative only in the retracted position of the latter; and automatic circuit-controlling means adapted to close the circuit through said electrode and carrier only when the latter is in advanced position.

97. In mechanism of the character described, the combination of a shaft; a carrier both rotatably and reciprocably mounted thereon; a plurality of mandrels on said carrier for supporting preliminarily formed tubular articles having a seam to be welded, an electrode adapted to coöperate with successive mandrels to weld the seam of the article supported thereon, said electrode and carrier being connected in a heating electric-circuit; a cam-drum on said shaft connected to reciprocate said carrier; means adapted to partially rotate said carrier, said means being operative only in the retracted position of the latter; and automatic circuit-closing means operable by said shaft to close the circuit through said electrode and carrier only when the latter is in advanced position.

98. In mechanism of the character described, the combination of a shaft; a carrier both rotatably and reciprocably mounted thereon; a plurality of mandrels on said carrier for supporting preliminarily formed tubular articles having a seam to be welded, an electrode adapted to coöperate with successive mandrels to weld the seam of the article supported thereon, said electrode and carrier being connected in a heating electric-circuit; a cam-drum on said shaft connected to reciprocate said carrier; means adapted to partially rotate said carrier, said means being operative only in the retracted position of the latter; and automatic circuit-controlling means adapted to close the circuit through said electrode and carrier only when the latter is in advanced position, said means including a rocker oscillatory by said shaft, an arm movable relatively to said rocker, contacts carried by said rocker and arm, respectively, means tending to swing said arm to close said contacts, and a stop preventing such closure except in one position of said rocker.

Signed by me, this 30th day of March, 1914.

CHARLIE L. HAWES.

Attested by—
 WARREN C. PRASSEN,
 C. A. KITTINGER.